US00RE43604E

(19) United States
(12) Reissued Patent
Hikosaka

(10) Patent Number: US RE43,604 E
(45) Date of Reissued Patent: Aug. 28, 2012

(54) POLYCARBONATE RESIN AND ELECTROPHOTOGRAPHIC PHOTOSENSITIVE MEMBER USING SAME

(75) Inventor: Takaaki Hikosaka, Chiba (JP)

(73) Assignee: Idemitsu Kosan Co. Ltd., Tokyo (JP)

(21) Appl. No.: 13/020,572

(22) Filed: Feb. 3, 2011

Related U.S. Patent Documents

Reissue of:
(64) Patent No.: 7,491,346
Issued: Feb. 17, 2009
Appl. No.: 11/596,849
PCT Filed: May 19, 2005
PCT No.: PCT/JP2005/009179
§ 371 (c)(1),
(2), (4) Date: Nov. 17, 2006
PCT Pub. No.: WO2005/113638
PCT Pub. Date: Dec. 1, 2005

(30) Foreign Application Priority Data

May 20, 2004 (JP) ..... 2004-150295

(51) Int. Cl.
*G03G 5/05* (2006.01)
*C08G 64/18* (2006.01)

(52) U.S. Cl. ..... 252/501.1; 528/26; 528/43

(58) Field of Classification Search ..... 252/501.1; 528/26
See application file for complete search history.

(56) References Cited

U.S. PATENT DOCUMENTS

| | | | |
|---|---|---|---|
| 4,217,438 | A | 8/1980 | Brunelle et al. |
| 5,283,142 | A | 2/1994 | Mayama et al. |
| 5,418,099 | A | 5/1995 | Mayama et al. |
| 5,932,677 | A | 8/1999 | Hoover et al. |
| 6,043,334 | A | 3/2000 | Kanamaru et al. |
| 6,476,249 | B1 | 11/2002 | Ito |
| 6,492,481 | B1 | 12/2002 | Davis et al. |
| 6,610,409 | B2 | 8/2003 | Pickett et al. |
| 6,833,422 | B2 | 12/2004 | Silva et al. |
| 6,861,482 | B2 | 3/2005 | Brunelle et al. |
| 2001/0039313 | A1 | 11/2001 | Ogawa et al. |
| 2002/0115791 | A1 | 8/2002 | Duncan et al. |
| 2003/0027905 | A1 | 2/2003 | Mahood et al. |
| 2003/0027928 | A1 | 2/2003 | Okamoto et al. |
| 2003/0065122 | A1 | 4/2003 | Davis |
| 2003/0105226 | A1 | 6/2003 | Cella et al. |
| 2007/0027271 | A1 | 2/2007 | Davis et al. |

FOREIGN PATENT DOCUMENTS

| | | | | |
|---|---|---|---|---|
| CN | 1 079 311 | | | 12/1993 |
| CN | 1079311 | A | | 12/1993 |
| EP | 0 500 087 | | | 8/1992 |
| EP | 0 500 087 | A1 | | 8/1992 |
| EP | 0570908 | A1 | | 5/1993 |
| EP | 0 570 908 | | | 11/1993 |
| JP | 06 136108 | | | 5/1994 |
| JP | 07 00299 | | | 1/1995 |
| JP | 07-00299 | A | | 1/1995 |
| JP | 09 059366 | | | 3/1997 |
| JP | 09-059366 | A | | 3/1997 |
| JP | 09 080790 | | | 3/1997 |
| JP | 09 080791 | | | 3/1997 |
| JP | 09080790 | A | * | 3/1997 |
| JP | 09080791 | A | * | 3/1997 |
| JP | 09 114270 | | | 5/1997 |
| JP | 09114270 | A | * | 5/1997 |
| JP | 10 010767 | | | 1/1998 |
| JP | 10010767 | A | * | 1/1998 |
| JP | 11 311870 | | | 11/1999 |
| JP | 11 316466 | | | 11/1999 |
| JP | 1136466 | A | * | 11/1999 |
| JP | 11311870 | A | * | 11/1999 |
| JP | 2000 235277 | | | 8/2000 |
| JP | 2000235277 | A | * | 8/2000 |
| JP | 2001 072846 | | | 3/2001 |
| JP | 2001072846 | A | * | 3/2001 |

(Continued)

OTHER PUBLICATIONS

Canon Inc., "Dry toner and method for formation of image," Patent Abstracts of Japan, Publication Date: Aug. 29, 2000, English Abstact of JP-2000 235277.

(Continued)

*Primary Examiner* — Robert Loewe
(74) *Attorney, Agent, or Firm* — Millen, White, Zelano & Branigan, P.C.

(57) ABSTRACT

Provided are a polycarbonate resin which can solve problems present in an electrophotographic photoreceptor and an electrophotographic photoreceptor in which the above polycarbonate resin is used and which is improved in a cleaning property, a lubricity and an abrasion resistance.

The polycarbonate resin comprises a repetitive unit represented by the following Formula (1), and the electrophotographic photoreceptor in which a photosensitive layer is provided on a conductive substrate contains the above polycarbonate resin in the above photosensitive layer. In the following Formula (1), R represents an alkyl group having 1 to 3 carbon atoms; n1 is an integer of 2 to 4; and n2 is an integer of 1 to 200.

(I)

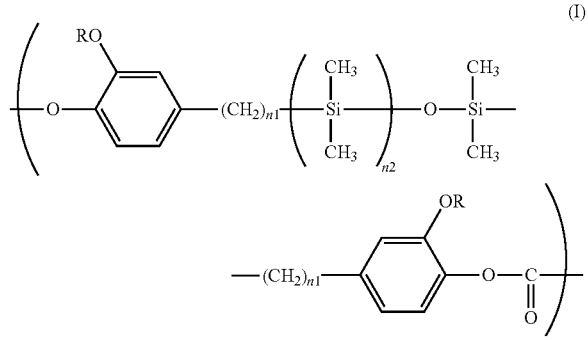

21 Claims, No Drawings

FOREIGN PATENT DOCUMENTS

| | | | | |
|---|---|---|---|---|
| JP | 2001 100441 | | | 4/2001 |
| JP | 2001100441 | A | * | 4/2001 |
| JP | 2001 325990 | | | 11/2001 |
| JP | 2001325990 | A | * | 11/2001 |
| JP | 2002 030140 | | | 1/2002 |
| JP | 2002030140 | A | * | 1/2002 |
| JP | 2002 322263 | | | 11/2002 |
| JP | 2002-322263 | A | | 11/2002 |
| JP | 2004 109606 | | | 4/2004 |
| JP | 2004109606 | A | * | 4/2004 |
| TW | 572 933 | | | 1/2004 |
| WO | WO-97 20878 | | | 6/1997 |
| WO | WO 9720878 | A1 | * | 6/1997 |

OTHER PUBLICATIONS

Canon Inc., "Electrophotographic photo receptor, process cartridge with same and electrophotographic device," Patent Abstracts of Japan, Publication Date: Jan. 16, 1998; English Abstract of JP-10 010767.

Canon Inc., "Electrophotographic photoreceptor and process cartridge and elelctrophotographic apparatus," Patent Abstracts of Japan, Publication Date: Mar. 28, 1997; English Abstracts of JP-09 080790.

Canon Inc., "Electrophotographic photoreceptor and process cartridge and elelctrophotographic apparatus," Patent Abstracts of Japan, Publication Date: Mar. 28, 1997; English Abstracts of JP-09 080791.

Canon Inc., "Electrophotographic photoreceptor, process cartridge and electrophotographic device," Patent Abstracts of Japan, Publication Date: Nov. 16, 1999; English Abstract of JP-11 316466.

Canon Inc., "Electrophotographic photoreceptor, process cartridge and electrophotographic device," Patent Abstracts of Japan, Publication Date: Apr. 8, 2004; English Abstract of JP-2004 109606.

Canon Inc., "Transfer material carrying member and image forming using the same," Patent Abstracts of Japan, Publication Date: May 2, 1997; English Abstract of JP 09 114270.

Idemitsu Petrochem Co Ltd., "Polycarbonate resin composition," Patent Abstracts of Japan, Publication Date: Mar. 21, 2001; English Abstract of JP-2001 072846.

Konica Corp., "Electrophotographic photoreceptor and method and device for forming electrophotographic image and process cartridge using the same," Patent Abstracts of Japan, Publication Date: Apr. 13, 2001; English Abstract of JP 2001 100441.

Machine Translation of JP-2002 030140 dated Mar. 24, 2008.

Mitsubishi Gas Chem Co Inc., "Copolycarbonate polymer as binder for electrophotographic photoreceptor and production of the polymer," Patent Abstracts of Japan, Publication Date: Mar. 4, 1997; English Abstract of JP-09 059366.

Mitsubishi Gas Chem Co Inc., "Electrophotographic photoreceptor," Patent Abstracts of Japan, Publication Date: Nov. 9, 1999; English Abstract of 11-311870.

Mitsubishi Gas Chem Co Inc., "Film for flat panel display," Patent Abstracts of Japan, Publication Date: Nov. 11, 2002; English Abstract of JP-2002 322263.

Mitsubishi Gas Chem Co Inc., "Polycarbonate resin and its manufacturing method," Patent Abstracts of Japan, Publication Date: Jan. 31, 2002; English Abstract of JP-2002 030140.

Mitsubishi Gas Chem Co Inc., "Solid Polymer Electrolyte," Patent Abstracts of Japan, Publication Date: Nov. 22, 2001; English Abstract of JP-2001 325990.

Supplementary European Search Report for EP 05 74 1587 dated Jun. 26, 2008.

Office Action for related Taiwan Patent Applciation dated Aug. 31, 2011.

Office Action of related Korean Patent Application dated Nov. 11, 2011.

Idemitsu Kosan Co Ltd., "Polycarbonate, It's production, and electrophotographic photoreceptor made therefrom," Patent Abstracts of Japan, Publication Date: May 17, 1994; English Abstract of JP-06 136108.

Machine Translation of JP-2002-030140.*

Supplementary European Search Report—EP 05 74 1587—dated Jun. 26, 2008.

* cited by examiner

POLYCARBONATE RESIN AND ELECTROPHOTOGRAPHIC PHOTOSENSITIVE MEMBER USING SAME

Matter enclosed in heavy brackets [ ] appears in the original patent but forms no part of this reissue specification; matter printed in italics indicates the additions made by reissue.

TECHNICAL FIELD

The present invention relates to a polycarbonate resin into which a specific structure is introduced and an electrophotographic photoreceptor in which the above polycarbonate resin is used for a photosensitive layer, more specifically to a polycarbonate resin which is chemically stable and which can achieve a reduction in a surface energy and an electrophotographic photoreceptor in which the above polycarbonate resin is used and which is improved in a cleaning property, a lubricity and an abrasion resistance and can suitably be used in the various electrophotographic fields.

BACKGROUND ART

Polycarbonate resins are used as a raw material in various fields including optical materials such as optical films, optical disks and lenses and housings such as electric appliances, and polycarbonate resins which are more excellent in performances are desired to be developed as the application fields are expanded.

On the other hand, in recent years, proposed as an electrophotographic photoreceptor in which a photosensitive layer is provided on a conductive substrate are an organic electrophotographic photoreceptor (OPC) of a laminate type having two layers of a charge generating layer (CGL) which generates a charge as a photosensitive layer at least by exposure and a charge transporting layer (CTL) which transports a charge and an organic electrophotographic photoreceptor of a single layer type in which a photosensitive layer comprises a single layer containing a charge generating material and a charge transporting material each dispersed in a binder resin or a single layer containing only a charge generating material dispersed in a binder resin, and they are used. Further, in order to improve a durability of an electrophotographic photoreceptor and enhance an image quality, put into actual use is OPC in which polytetrafluoroethylene fine particles are dispersed in a photosensitive layer or in which an overcoat layer is provided on an uppermost layer of a photosensitive layer (refer to, for example, a Non-Patent Document 1).

The above organic electrophotographic photoreceptor is required to be provided with a prescribed sensitivity, electric characteristics and optical characteristics according to electrophotographic processes applied. In the above organic electrophotographic photoreceptor, the surface of the photosensitive layer is subjected repeatedly to operations such as corona charge or contact charge using a roll and a brush, toner development, transfer onto paper and cleaning treatment, and therefore electric and mechanical external forces are exerted every timer the above operations are carried out. Accordingly, a durability against the above external forces are requested to a photosensitive layer provided on the surface of an electrophotographic photoreceptor in order to maintain an image quality of electrographs over a long period of time. To be specific, required is a durability against generation of abrasion and scratches on the surface caused by friction, corona charge and contact charge and deterioration of the surface caused by active gas such as ozone in transferring.

In order to meet the above requirements, polycarbonate resins having a good compatibility with a charge transporting material used for a photosensitive layer and good optical characteristics have been used as a binder resin for an organic electrophotographic photoreceptor. That is, polycarbonate resins in which 2,2-bis(4-hydroxyphenyl)propane (bisphenol A) and 1,1-bis(4-hydroxyphenyl)cyclohexane (bisphenol Z) are used as raw materials have been used as the above polycarbonate resins. However, even the above polycarbonate resins in which the above bisphenol A and bisphenol Z are used as raw materials are unsatisfactory for satisfying the requirements described above.

Electrophotographic photoreceptors containing a polycarbonate resin copolymerized with siloxane are investigated as means for solving the problems described above (refer to, for example, Patent Documents 1, 2 and 3). However, the copolymers disclosed in the above documents are combined via a chemically instable Si—O—C bond and therefore involve problems on deterioration of mechanical characteristics caused by cutting of molecular chains and degradation of charging characteristics brought about by a silanol group remaining at a molecular end. In order to solve the above problems, copolymerized polycarbonate resins combined via a chemically stable Si—C bond are proposed (refer to, for example, Patent Documents 4 and 5). Photoreceptors using the above polycarbonate resins have a low surface energy and therefore are improved in a cleaning characteristic, but they do not necessarily have a satisfactory effect of improving an abrasion resistance.

[Non-Patent Document 1]: No. 3 Japan Image Academy, Lecture Abstract of Technical Courses, p. 91

[Patent Document 1]: Japanese Patent Application Laid-Open No. 132954/1986

[Patent Document 2]: Japanese Patent Application Laid-Open No. 240655/1990

[Patent Document 3]: U.S. Pat. No. 2,989,251

[Patent Document 4]: Japanese Patent Application Laid-Open No. 72753/1993

[Patent Document 5]: Japanese Patent Application Laid-Open No. 232503/1998

DISCLOSURE OF THE INVENTION

Problems to be Solved by the Invention

The present invention has been made in light of the circumstances described above, and an object thereof is to provide a polycarbonate resin capable of solving the problems described above which are observed in electrophotographic photoreceptors using polycarbonate resins comprising bisphenol A and bisphenol Z as raw materials and an electrophotographic photoreceptor which uses the above polycarbonate resin and which is improved in a cleaning property, a lubricity and an abrasion resistance.

Means for Solving the Problems

Intensive researches repeated by the present inventors have resulted in finding that a polycarbonate resin into which a specific siloxane structure is introduced meets the object described above. The present invention has been completed based on such knowledge.

That is, the present invention comprises the following essential points.

[1] A polycarbonate resin comprising a repetitive unit represented by the following Formula (1):

[F1]

(1)

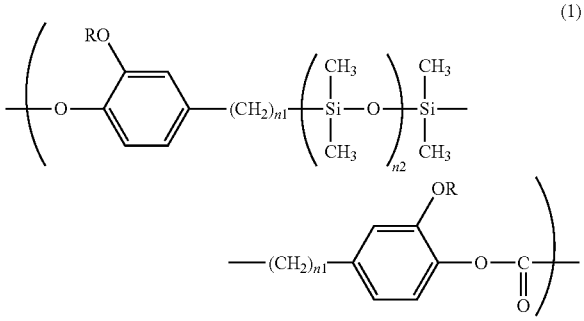

(wherein R represents an alkyl group having 1 to 3 carbon atoms; n1 is an integer of 2 to 4; and n2 is an integer of 1 to 200).

[2] The polycarbonate resin as described in the above item [1], wherein the polycarbonate resin further comprises a repetitive unit represented by the following Formula (2):

[F2]

(2)

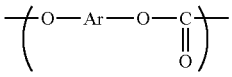

(wherein Ar represents a divalent aromatic group).

[3] The polycarbonate resin as described in the above item [2], wherein Ar in Formula (2) comprises at least one of groups represented by the following Formula (3):

[F3]

(3)

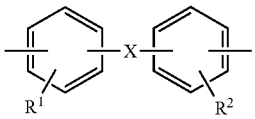

[wherein $R^1$ and $R^2$ each represent independently a group selected from a trifluoromethyl group, a halogen atom, an alkyl group having 1 to 10 carbon atoms, an aryl group having 6 to 12 carbon atoms, a cycloalkyl group having 3 to 12 carbon atoms, an alkoxy group having 1 to 6 carbon atoms and an aryloxy group having 6 to 12 carbon atoms; and X represents a group selected from a single bond, —O—, —S—, —SO—, —$SO_2$—, —CO—, —$CR^3R^4$— (wherein $R^3$ and $R^4$ each represent independently a group selected from a hydrogen atom, a trifluoromethyl group, a substituted or unsubstituted alkyl group having 1 to 10 carbon atoms and a substituted or unsubstituted aryl group having 6 to 12 carbon atoms), a substituted or unsubstituted cycloalkylidene group having 5 to 11 carbon atoms, a substituted or unsubstituted α,ω-alkylene group having 2 to 12 carbon-atoms, a substituted or unsubstituted 9,9-fluorenylidene group, a substituted or unsubstituted arylene group having 6 to 12 carbon atoms, a divalent group derived from natural terpenes represented by the following formula:

[F4]

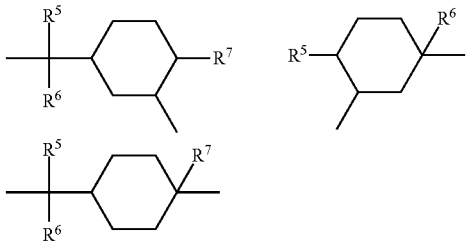

(wherein $R^5$ to $R^7$ represent the same groups as those represented by $R^1$ and $R^2$) and an alkylidenearylenealkylidene group having 8 to 16 carbon atoms represented by the following formula:

[F5]

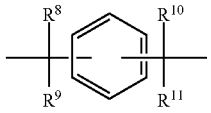

(wherein $R^8$ to $R^{11}$ represent the same groups as those represented by $R^1$ and $R^2$)].

[4] The polycarbonate resin as described in the above item [3], wherein X in Formula (3) is a group selected from —$CR^3R^4$—, a single bond, a substituted or unsubstituted cycloalkylidene group having 5 to 11 carbon atoms and a substituted or unsubstituted 9,9-fluorenylidene group.

[5] The polycarbonate resin as described in the above item [3], wherein X in Formula (3) is —$CR^3R^4$—, and a proportion of the repetitive unit represented by Formula (1) is 0.01 to 3.9 mass % based on the whole part of the polycarbonate resin.

[6] The polycarbonate resin as described in the above item [3], wherein the group represented by Formula (3) is (a) a combination of the group in which X is a single bond and the group in which X is a group other than a single bond, (b) a combination of the group in which X is the substituted or unsubstituted cycloalkylidene group having 5 to 11 carbon atoms and the group in which X is a group other than the substituted or unsubstituted cycloalkylidene group having 5 to 11 carbon atoms, (c) a combination of the group in which X is the substituted or unsubstituted 9,9-fluorenylidene group and the group in which X is a group other than the substituted or unsubstituted 9,9-fluorenylidene group, (d) a combination of the group in which X is the alkylidenearylenealkylidene group having 8 to 16 carbon atoms and the group in which X is a group other than the alkylidenearylenealkylidene group having 8 to 16 carbon atoms, (e) a combination of the group in which X is —SO— and the group in which X is a group other than —SO—, (f) a combination of the group in which X is —O— and the group in which X is a group other than —O— or (g) a combination of the group in which X is —CO— and the group in which X is a group other than —CO—.

[7] An electrophotographic photoreceptor in which a photosensitive layer is provided on a conductive substrate, wherein the above photosensitive layer comprises the polycarbonate resin having the repetitive unit represented by Formula (1) described above.

[8] The electrophotographic photoreceptor as described in the above item [7], wherein the polycarbonate resin contained in the photosensitive layer further comprises the repetitive unit represented by Formula (2) described above.

[9] The electrophotographic photoreceptor as described in the above item [8], wherein Ar in Formula (2) comprises at least one of the groups represented by Formula (3) described above.

[10] The electrophotographic photoreceptor as described in the above item [9], wherein X in Formula (3) is a group selected from —$CR^3R^4$—, a single bond, a substituted or unsubstituted cycloalkylidene group having 5 to 11 carbon atoms and a substituted or unsubstituted 9,9-fluorenylidene group.

[11] The electrophotographic photoreceptor as described in the above item [9], wherein X in Formula (3) is —$CR^3R^4$—, and a proportion of the repetitive unit represented by Formula (1) is 0.01 to 3.9 mass % based on the whole part of the polycarbonate resin.

[12] The electrophotographic photoreceptor as described in the above item [9], wherein the group represented by Formula (3) is (a) a combination of the group in which X is a single bond and the group in which X is a group other than a single bond, (b) a combination of the group in which X is the substituted or unsubstituted cycloalkylidene group having 5 to 11 carbon atoms and the group in which X is a group other than the substituted or unsubstituted cycloalkylidene group having 5 to 11 carbon atoms, (c) a combination of the group in which X is the substituted or unsubstituted 9,9-fluorenylidene group and the group in which X is a group other than the substituted or unsubstituted 9,9-fluorenylidene group, (d) a combination of the group in which X is the alkylidenearylenealkylidene group having 8 to 16 carbon atoms and the group in which X is a group other than the alkylidenearylenealkylidene group having 8 to 16 carbon atoms, (e) a combination of the group in which X is —SO— and the group in which X is a group other than —SO—, (f) a combination of the group in which X is —O— and the group in which X is a group other than —O— or (g) a combination of the group in which X is —CO— and the group in which X is a group other than —CO—.

Effects of the Invention

According to the present invention, a polycarbonate resin which is chemically stable and which can achieve a reduction in a surface energy is used as a binder resin for a photosensitive layer of an electrophotographic photoreceptor, and therefore an electrophotographic photoreceptor which is improved in a cleaning property, a lubricity and an abrasion resistance can be provided.

BEST MODE FOR CARRYING OUT THE INVENTION

The polycarbonate resin of the present invention comprises a repetitive unit [hereinafter referred to as the repetitive unit (a)] represented by the following Formula (1):

[F6]

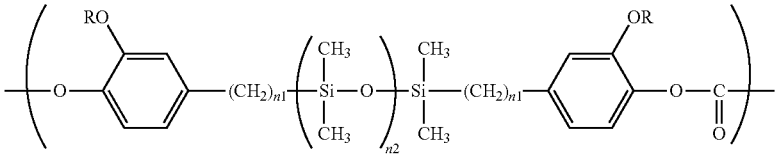

(1)

(wherein R represents an alkyl group having 1 to 3 carbon atoms; n1 is an integer of 2 to 4, preferably 3; and n2 is an integer of 1 to 200, preferably 3 to 150 and more preferably 10 to 100). The electrophotographic photoreceptor of the present invention has a structure in which a photosensitive layer is provided on a conductive substrate, and the polycarbonate resin described above is contained in the above photosensitive layer. In Formula (1) described above, the alkyl group having 1 to 3 carbon atoms represented by R is methyl, ethyl, n-propyl and isopropyl, and methyl is preferred in the present invention.

In the present invention, the polycarbonate resin may further comprise a repetitive unit [hereinafter referred to as the repetitive unit (b)] represented by the following Formula (2):

[F7]

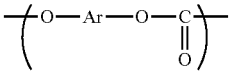

(2)

(wherein Ar represents a divalent aromatic group) in addition to the repetitive unit represented by Formula (1) described above. Ar in Formula (2) described above includes groups comprising at least one of groups represented by the following Formula (3):

[F8]

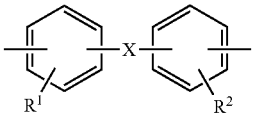

(3)

In Formula (3) described above, $R^1$ and $R^2$ each represent independently a group selected from a trifluoromethyl group, a halogen atom, an alkyl group having 1 to 10 carbon atoms, preferably 1 to 6 carbon atoms, an aryl group having 6 to 12 carbon atoms, preferably 6 to 10 carbon atoms, a cycloalkyl group having 3 to 12 carbon atoms, preferably 5 to 9 carbon atoms, an alkoxy group having 1 to 6 carbon atoms and an aryloxy group having 6 to 12 carbon atoms, preferably 6 to 10 carbon atoms. The halogen atom includes fluorine, chlorine, bromine and iodine. The alkyl group having 1 to 10 carbon atoms includes methyl, ethyl, n-propyl, isopropyl, n-butyl, isobutyl, sec-butyl, tert-butyl, various pentyls, various hexyls, various heptyls, various octyls and 2-methoxyethyl. The aryl group having 6 to 12 carbon atoms includes phenyl, tolyl and xylyl. The cycloalkyl group having 3 to 12 carbon atoms includes cyclopropyl, cyclobutyl, cyclopentyl and cyclohexyl.

The alkoxy group having 1 to 6 carbon atoms includes methoxy, ethoxy, n-propoxy, isopropoxy, n-butoxy, isobutoxy, sec-butoxy, tert-butoxy and various pentoxy. The aryloxy group having 6 to 12 carbon atoms includes phenoxy, 2,6-dimethylphenoxy and naphthyloxy.

In Formula (3) described above, X represents a group selected from a single bond, —O—, —S—, —SO—, —$SO_2$—, —CO—, —$CR^3R^4$— (wherein $R^3$ and $R^4$ each represent independently a group selected from a hydrogen atom, a trifluoromethyl group, a substituted or unsubstituted alkyl group having 1 to 10 carbon atoms and a substituted or unsubstituted aryl group having 6 to 12 carbon atoms, preferably 6 to 10 carbon atoms), a substituted or unsubstituted cycloalkylidene group having 5 to 11 carbon atoms, preferably 5 to 9 carbon-atoms, a substituted or unsubstituted α,ω-alkylene group having 2 to 12 carbon atoms, preferably 2 to 6 carbon atoms, a substituted or unsubstituted 9,9-fluorenylidene group, a substituted or unsubstituted arylene group having 6 to 12 carbon atoms, preferably 6 to 10 carbon atoms, a divalent group derived from natural terpenes represented by the following formula:

[F9]

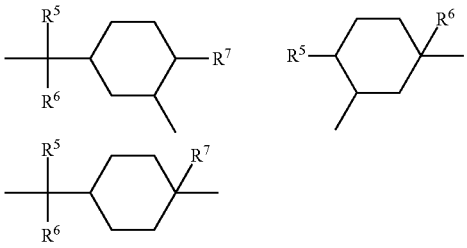

(wherein $R^5$ to $R^7$ represent the same groups as those represented by $R^1$ and $R^2$) and an alkylidenearylenealkylidene group having 8 to 16 carbon atoms, preferably 12 to 16 carbon atoms represented by the following formula:

[F10]

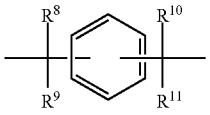

(wherein $R^8$ to $R^{11}$ represent the same groups as the groups represented by $R^1$ and $R^2$).

Among X described above, the substituted or unsubstituted alkyl group having 1 to 10 carbon atoms and the substituted or unsubstituted aryl group having 6 to 12 carbon atoms each represented by $R^3$ and $R^4$ in —$CR^3R^4$— include the same groups as the groups represented by $R^1$ and $R^2$ in Formula (3) described above.

Among X, the substituted or unsubstituted cycloalkylidene group having 5 to 11 carbon atoms includes cyclopentylidene, cyclohexylidene and cycloheptylidene. The substituted or unsubstituted α,ω-alkylene group having 2 to 12 carbon atoms includes α,ω-ethylene, α,ω-propylene and α,ω-butylene. The substituted or unsubstituted arylene group having 6 to 12 carbon atoms includes phenylene, alkyl-substituted phenylene, naphthylene and alkyl-substituted naphthylene.

The combination of the repetitive unit represented by Formula (2) includes (a) a combination of the group in which X is a single bond and the group in which X is a group other than a single bond, (b) a combination of the group in which X is the substituted or unsubstituted cycloalkylidene group having 5 to 11 carbon atoms and the group in which X is a group other than the substituted or unsubstituted cycloalkylidene group having 5 to 11 carbon atoms, (c) a combination of the group in which X is the substituted or unsubstituted 9,9-fluorenylidene group and the group in which X is a group other than the substituted or unsubstituted 9,9-fluorenylidene group, (d) a combination of the group in which X is the alkylidenearylenealkylidene group having 8 to 16 carbon atoms and the group in which X is a group other than the alkylidenearylenealkylidene group having 8 to 16 carbon atoms, (e) a combination of the group in which X is —SO— and the group in which X is a group other than —SO—, (f) a combination of the group in which X is —O— and the group in which X is a group other than —O— or (g) a combination of the group in which X is —CO— and the group in which X is a group other than —CO—.

A solution of the polycarbonate resin comprising the repetitive unit described above in which methylene chloride is used as a solvent and in which a concentration is 0.5 g/dl has a reduced viscosity [$\eta_{sp}$/C] of preferably 0.1 to 5.0 dl/g, more preferably 0.2 to 3.0 dl/g and particularly preferably 0.3 to 2.5 dl/g at 20° C. If the reduced viscosity [$\eta_{sp}$/C] is less than 0.1 dl/g, a printing resistance of the electrophotographic photoreceptor is likely to be unsatisfactory. On the other hand, if the reduced viscosity [$\eta_{sp}$/C] exceeds 5.0 dl/g, the coating viscosity becomes too high in producing the photoreceptor, whereby a productivity of the electrophotographic photoreceptor is likely to be reduced. Accordingly, both are not preferred.

In a copolymerized polycarbonate resin comprising the repetitive unit (a) and the repetitive unit (b), a content proportion of the repetitive unit (a) to the repetitive unit (b) shall not specifically be restricted, and (a)/[(a)+(b)] (mass ratio) is preferably 0.0001 to 0.30, more preferably 0.001 to 0.10 and further preferably 0.005 to 0.039 from the viewpoint of the physical properties of the binder resin and a balance between the cleaning property, the lubricity and the abrasion resistance.

The polycarbonate resin used for the binder resin in the electrophotographic photoreceptor of the present invention may comprise other repetitive units than the repetitive unit (a) and the repetitive unit (b) as long as troubles are not exerted on the object of the present invention. Also, the electrophotographic photoreceptor of the present invention may suitably be blended with polymers other than the polycarbonate resin according to the present invention and additives in the photosensitive layer.

A production process for the polycarbonate resin comprising the repetitive unit (a) or the polycarbonate resin comprising the repetitive unit (a) and the repetitive unit (b) used for the electrophotographic photoreceptor of the present invention shall not specifically be restricted, and it can be produced by various processes based on publicly known processes using suitable monomers. The polycarbonate resin comprising the repetitive unit (a) can be produced by, for example, reacting a bisphenol compound (hereinafter referred to as a component [A]) represented by the following Formula (4):

[F11]

(4)

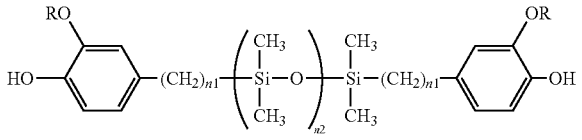

(wherein R, n1 and n2 are the same as described above) with carbonic acid ester-forming compound. The polycarbonate resin comprising the repetitive unit (a) and the repetitive unit (b) can be produced by, for example, reacting a mixture of the component [A] described above and a bisphenol compound (hereinafter referred to as a component [B]) represented by the following Formula (5):

[F12]

$$HO—Ar—OH \quad (5)$$

(wherein Ar is the same as described above) with carbonic acid ester-forming compound. In this case, the molecular weight can be controlled by using an end terminating agent.

The specific examples of the bisphenol compound of the component [A] include 4-[4-hydroxy-3-methoxyphenyl]ethyl(polydimethylsiloxy)-dimethylsilylethyl]-2-methoxyphenol, 4-[4-hydroxy-3-methoxyphenyl]propyl(polydimethylsiloxy)-dimethylsilylpropyl]-2-methoxyphenol and 4-[4-hydroxy-3-methoxyphenyl]butyl(polydimethylsiloxy)-dimethylsilylbutyl]-2-methoxyphenol.

The specific examples of the bisphenol compound of the component [B] include bis(4-hydroxyphenyl)methane, 1,1-bis(4-hydroxyphenyl)ethane, 1,2-bis(4-hydroxyphenyl)ethane, 2-2-bis(4-hydroxyphenyl)propane, 2,2-bis(3-methyl-4-hydroxyphenyl)butane, 2,2-bis(4-hydroxyphenyl)butane, 2,2-bis(4-hydroxyphenyl)octane, 4,4-bis(4-hydroxyphenyl)heptane, 1,1-bis(4-hydroxyphenyl)-1,1-diphenylmethane, 1,1-bis(4-hydroxyphenyl)-1-phenylethane, 1,1-bis(4-hydroxyphenyl)-1-phenylmethane, bis(4-hydroxyphenyl)ether, bis(4-hydroxyphenyl)sulfide, bis(4-hydroxyphenyl)sulfone, 1,1-bis(4-hydroxyphenyl)cyclopentane, 1,1-bis(3-methyl-4-hydroxyphenyl)cyclopentane, 1,1-bis(4-hydroxyphenyl)cyclohexane, 2,2-bis(3-methyl-4-hydroxyphenyl)propane, 2,2-bis(3-phenyl-4-hydroxyphenyl)propane, 2-(3-methyl-4-hydroxyphenyl)-2-(4-hydroxyphenyl)-1-phenylethane, bis(3-methyl-4-hydroxyphenyl)sulfide, bis(3-methyl-4-hydroxyphenyl)sulfone, bis(3-methyl-4-hydroxyphenyl)methane, 1,1-bis(3-methyl-4-hydroxyphenyl)cyclohexane, 4,4-biphenol, 3,3'-dimethyl-4,4'-biphenol, 3,3'-diphenyl-4,4'-biphenol, 3,3'-dichloro-4-4'-biphenol, 3,3'-difluoro-4,4'-biphenol, 3,3',5,5'-tetramethyl-4-4'-biphenol, 2,7-naphthalenediol, 2,6-naphthalenediol, 1,4-naphthalenediol, 1,5-naphthalenediol, 2,2-bis(2-methyl-4-hydroxyphenyl)propane, 1,1-bis(2-butyl-4-hydroxy-5-methylphenyl)butane, 1,1-bis(2-tert-butyl-4-hydroxy-3-methylphenyl)ethane, 1,1-bis(2-tert-butyl-4-hydroxy-5-methylphenyl)propane, 1,1-bis(2-tert-butyl-4-hydroxy-5-methylphenyl)butane, 1,1-bis(2-tert-butyl-4-hydroxy-5-methylphenyl)isobutene, 1,1-bis(2-tert-butyl-4-hydroxy-5-methylphenyl)heptane, 1,1-bis(2-tert-butyl-4-hydroxy-5-methylphenyl)-1-phenylmethane, 1,1-bis(2-tert-amyl-4-hydroxy-5-methylphenyl)butane, bis(3-chloro-4-hydroxyphenyl)methane, bis(3,5-dibromo-4-hydroxyphenyl)methane, 2,2-bis(3-chloro-4-hydroxyphenyl)propane, 2,2-bis(3-fluoro-4-hydroxyphenyl)propane, 2,2-bis(3-bromo-4-hydroxyphenyl)propane, 2,2-bis(3,5-difluoro-4-hydroxyphenyl)propane, 2,2-bis(3,5-dichloro-4-hydroxyphenyl)propane, 2,2-bis(3,5-dibromo-4-hydroxyphenyl)propane, 2,2-bis(3-bromo-4-hydroxy-5-chlorophenyl)propane, 2,2-bis(3,5-dichloro-4-hydroxyphenyl)butane, 2,2-bis(3,5-dibromo-4-hydroxyphenyl)butane, 1-phenyl-1,1-bis(3-fluoro-4-hydroxyphenyl)ethane, bis(3-fluoro-4-hydroxyphenyl)ether, 3,3'-difluoro-4,4'-dihydroxybiphenyl, 1,1'-bis(3-cyclohexyl-4-hydroxyphenyl)cyclohexane, 2,2-bis(4-hydroxyphenyl)hexafluoropropane, 2,2-bis(3-phenyl-4-hydroxyphenyl)propane, 1,1-bis(3-phenyl-4-hydroxyphenyl)cyclohexane, bis(3-phenyl-4-hydroxyphenyl)sulfone, 4,4'-(3,3,5-trimethylcyclohexylidene)diphenol, 4,4'-[1,4-phenylenebis(1-methylethylidene)]bisphenol, 4,4'-[1,3-phenylenebis(1-methylethylidene)]bisphenol, 9,9-bis(4-hydroxyphenyl)fluorene, 9,9-bis(3-methyl-4-hydroxyphenyl)fluorene, end-phenolpolydimethylsiloxane and α-trimethylsiloxy-ω-bis{3-(2-hydroxyphenyl)propyldimethylsiloxy}-methylsiloxy-2-dimethylsilylethyl-polydimethylsiloxane.

The above bisphenol compounds may be used alone or in a mixture of two or more kinds thereof.

Among the above bisphenol compounds, preferred are 1,1-bis(4-hydroxyphenyl)ethane, 2,2-bis(4-hydroxyphenyl)butane, 2,2-bis(4-hydroxyphenyl)propane, 1,1-bis(4-hydroxyphenyl)-1,1-diphenylmethane, 1,1-bis(4-hydroxyphenyl)-1-phenylethane, bis(4-hydroxyphenyl)sulfone, 1,1-bis(4-hydroxyphenyl)cyclohexane, 2,2-bis(3-methyl-4-hydroxyphenyl)propane, 1,1-bis(3-methyl-4-hydroxyphenyl)cyclohexane, 1,1-bis(3-methyl-4-hydroxyphenyl)cyclopentane, 4,4'-biphenol, 2,2-bis(3-phenyl-4-hydroxyphenyl)propane, 4,4'-(3,3,5-trimethylcyclohexylidene)diphenol, 4,4'-[1,4-phenylenebis(1-methylethylidene)]bisphenol, 9,9-bis(4-hydroxyphenyl)fluorene and 9,9-bis(3-methyl-4-hydroxyphenyl)fluorene.

More preferred are 1,1-bis(4-hydroxyphenyl)ethane, 2-2-bis(4-hydroxyphenyl)butane, 2,2-bis(4-hydroxyphenyl)propane, 1,1-bis(4-hydroxyphenyl)-1-phenylethane, 1,1-bis(4-hydroxyphenyl)cyclohexane, 2,2-bis(3-methyl-4-hydroxyphenyl)propane, 1,1-bis(3-methyl-4-hydroxyphenyl)cyclohexane, 1,1-bis(3-methyl-4-hydroxyphenyl)cyclopentane, 4,4'-biphenol, 2,2-bis(3-phenyl-4-hydroxyphenyl)propane, 4,4'-(3,3,5-trimethylcyclohexylidene)diphenol and 9,9-bis(3-methyl-4-hydroxyphenyl)fluorene.

The carbonic acid ester-forming compound (hereinafter referred to as the carbonate precursor) includes dihalogenated carbonyls such as phosgene, phosgene dimer and phosgene trimer and haloformates such as chloroformate.

Further, the end terminating agent includes, for example, p-tert-butylphenol, p-phenylphenol, p-cumylphenol, hydrofluoroalcohols such as 2,3,3-tetrafluoropropanol, 2,2,3,3,4,4,5,5-octafluoropentanol and 2,2,3,3,4,4,5,5,6,6,7,7-dodecafluoroheptanol and perfluorooctylphenol.

When halogenated carbonyls such as phosgene or haloformates such as chloroformate are used as the carbonate precursor, this reaction can be carried out in a suitable solvent under the presence of an acid acceptor (for example, basic alkaline metal compounds such as alkaline metal hydroxides and alkaline metal carbonates and organic bases such as pyridine). They are usually used in the form of aqueous solution.

Various compounds can be used as alkaline metal hydroxides and alkaline metal carbonates, and usually sodium hydroxide, potassium hydroxide, sodium carbonate and potassium carbonate are suitably used from an economical point of view.

A use proportion of the carbonate precursor described above may suitably be controlled taking a stoichiometric ratio (equivalent) of the reaction into consideration. When using the gaseous carbonate precursor such as phosgene, a method for blowing this into a reaction system can suitably be adopted.

A use proportion of the acid acceptor described above may suitably be determined as well taking a stoichiometric ratio (equivalent) of the reaction into consideration. To be specific, preferably used is the acid acceptor of 2 equivalents or a little more excessive amount than this based on the total mole number (usually, one mole corresponds to an equivalent) of the bisphenol compound used.

Various solvents such as those used in producing publicly known polycarbonates may be used as the solvent described above alone or in the form of a mixed solvent of two or more kinds thereof. The representative examples thereof include, for example, hydrocarbon solvents such as toluene, xylene and the like and halogenated hydrocarbon solvents including methylene chloride and chlorobenzene.

In order to accelerate the polycondensation reaction, capable of being added to carry out the reaction are a catalyst such as tertiary amines including triethylamine and quaternary amines and a branching agent such as fluoroglycine, pyrogallol, 4,6-dimethyl-2,4,6-tris(4-hydroxyphenyl)-2-heptene, 1,3,5-tris(4-hydroxyphenyl)benzene, 1,1,1-tris(4-hydroxyphenyl)ethane, tris(4-hydroxyphenyl)phenylmethane, 2,2-bis[4,4-bis(4-hydroxyphenyl)cyclohexyl]propane, 2,4-bis[2-bis(4-hydroxyphenyl)-2-propyl]phenol, 2,6-bis(2-hydroxy-5-methylbenzyl)-4-methylphenol, 2-(4-hydroxyphenyl)-2-(2,4-dihydroxyphenyl)propane, tetrakis(4-hydroxyphenyl)methane, tetrakis[4-(4-hydroxyphenylisopropyl)phenoxy]methane, 2,4-dihyroxybenzoic acid, trimesic acid and cyanuric acid.

Further, a small amount of an antioxidant such as sodium sulfite, hydrosulfite and the like may be added if necessary.

The reaction is usually carried out at temperature falling in a range of 0 to 150° C., preferably 5 to 40° C. The reaction can be carried out under any of reduced pressure, atmospheric pressure and applied pressure, and usually it can suitably be carried out at atmospheric pressure or own pressure of the reaction system. The reaction time is usually 0.5 minute to 10 hours, preferably 1 minute to 2 hours. The reaction method may be any of a continuous method, a semi-continuous method and a batch method. The reaction conditions described above and a use amount of the end terminating agent (molecular-weight-modifier) described above may suitably be selected in order to allow the reduced viscosity $[\eta_{sp}/C]$ to fall in the range described above. The polycarbonate resin obtained is suitably subjected, if necessary, to physical treatment (mixing, fractionation and the like) and/or chemical treatment (polymer reaction, cross-linking treatment, partial decomposition treatment and the like), whereby the polycarbonate resin having a prescribed reduced viscosity $[\eta_{sp}/C]$ can be obtained.

The reaction product (crude product) obtained is subjected to various publicly known after-treatments such as a separating and refining method and the like and can be recovered in the form of a polycarbonate resin having a desired purity (refining degree).

The electrophotographic photoreceptor of the present invention is an electrophotographic photoreceptor in which a photosensitive layer is provided on a conductive substrate, and the above photosensitive layer has a surface layer comprising the polycarbonate resin described above. The electrophotographic photoreceptor of the present invention shall not specifically be restricted in a structure as long as the above photosensitive layer is formed on a conductive substrate, and it may assume any structure including electrophotographic photoreceptors of various publicly known systems such as a single layer type, a laminated type and the like. Usually, preferred is a laminated type electrophotographic photoreceptor in which a photosensitive layer comprises at least one charge generating layer and at least one charge transporting layer forming a surface layer, and the polycarbonate resin described above is preferably used as a binder resin and/or the surface layer described above in at least one charge transporting layer.

In the electrophotographic photoreceptor of the present invention, when the polycarbonate resin described above is used as the binder resin, the above polycarbonate resin may be used alone or in combination of two or more kinds thereof or may be used, if necessary, in combination with resinous components in other polycarbonate resins as long as the object of the present invention is inhibited from being achieved.

Various substrates including publicly known substrates can be used as the conductive substrate used for the electrophotographic photoreceptor of the present invention, and to be specific, capable of being used are plates, drums and sheets comprising aluminum, nickel, chromium, palladium, titanium, molybdenum, indium, gold, platinum, silver, copper, zinc, brass, stainless steel, lead oxide, tin oxide, indium oxide, ITO (indium tin oxide: tin-doped indium oxide) and graphite, glasses, cloths, papers and films, sheets and seamless sieverts of plastics which are subjected to conductive treatment by vapor deposition, sputtering and coating and metal drums subjected to metal oxidation treatment by electrode oxidation.

A charge generating layer of a laminated type electrophotographic photoreceptor contains at least charge generating substance, and this charge generating layer can be obtained by forming a layer of the charge generating substance on a substrate which is a base therefor by a vacuum vapor deposition method, a chemical vapor deposition method and a sputtering method or forming a layer by binding the charge generating substance on a substrate which is a base therefor using a binder resin. Various methods such as publicly known methods can be used as a method for forming the charge generating layer using the binder resin. Usually, suitably used is a method in which a coating liquid prepared by dispersing or dissolving a charge generating substance in a suitable solvent together with a binder resin is coated on a layer which is a prescribed base and dried. The charge generating layer thus obtained has a thickness of usually 0.01 to 2.0 μm, preferably 0.1 to 0.8 μm. If the charge generating layer has a thickness of less than 0.01 μm, it is likely to be difficult to form the layer in an even thickness. On the other hand, if it exceeds 2.0 μm, a reduction in the electrophotographic characteristics is likely to be brought about.

Various publicly known compounds can be used as the charge generating material in the charge generating layer described above. The specific compounds include selenium elemental substances such as amorphous selenium and trigonal selenium, selenium alloys such as selenium-tellurium, selenium compounds such as $As_2Se_3$ or selenium-containing compositions, zinc oxide, inorganic materials comprising the 12th group and the 16th group in the periodic table such as CdS—Se, oxide base semiconductors such as titanium oxide, silicon base materials such as amorphous silicon, metal-free phthalocyanine pigments such as τ type metal-free phthalocyanine and χ type metal-free phthalocyanine, metal phthalocyanine pigments such as α type copper phthalocyanine, β type copper phthalocyanine, γ type copper phthalocyanine, ϵ type copper phthalocyanine, X type copper phthalocyanine, A type titanyl phthalocyanine, B type titanyl phthalocyanine, C type titanyl phthalocyanine, D type titanyl phthalocyanine, E type titanyl phthalocyanine, F type titanyl phthalocyanine, G type titanyl phthalocyanine, H type titanyl phthalocyanine, K type titanyl phthalocyanine, L type titanyl phthalocyanine, M type titanyl phthalocyanine, N type titanyl phthalocyanine, Y type titanyl phthalocyanine, oxotitanyl phthalocyanine and titanyl phthalocyanine in which a Bragg angle 2 θ shows a strong diffraction peak at 27.3±0.2 degrees in an X-ray diffraction diagram, cyanine dyes, anthracene pigments, bisazo pigments, pyrene pigments, polycyclic quinone pigments, quinacridone pigments, indigo pigments, perylene pigments, pyrylium pigments, squarium pigments, anthoanthrone pigments, benzimidazole pigments, azo pigments, thioindigo pigments, quinoline pigments, lake pigments, oxazine pigments, dioxazine pigments, triphenylmethane pigments, azulenium pigments, triarylmethane pigments, xanthene pigments, thiazine pigments, thiapyrylium pigments, polyvinylcarbazole and bisbenzimidazole pigments. The above compounds can be used alone or in a mixture of two or more kinds thereof as the charge generating material.

Among the above charge generating-materials, suitable ones include compounds specifically described in Japanese Patent Application Laid-Open No. 172003/1999.

The binder resin in the charge generating layer described above shall not specifically be restricted, and various publicly known resins can be used. To be specific, it includes polystyrene, polyvinyl chloride, polyvinyl acetate, vinyl chloride-vinyl acetate copolymers, polyvinyl acetal, alkid resins, acryl resins, polyacrylonitrile, polycarbonates, polyamides, butyral resins, polyesters, vinylidene chloride-vinyl chloride copolymers, methacryl resins, styrene-butadiene copolymers, vinylidene chloride-acrylonitrile copolymers, vinyl chloride-vinyl acetate-maleic anhydride copolymers, silicone resins, silicone-alkid resins, phenol-formaldehyde resins, styrene-alkid resins, melamine resins, polyether resins, benzoguanamine resins, epoxy acrylate resins, urethane acrylate resins, poly-N-vinylcarbazole, polyvinylbutyral, polyvinylformal, polysulfone, casein, gelatin, polyvinyl alcohol, ethyl cellulose, nitrocellulose, carboxymethyl cellulose, vinylidene chloride base polymer latexes, acrylonitrile-butadiene copolymers, vinyltoluene-styrene copolymers, soybean oil-modified alkid resins, nitrated polystyrene, polymethylstyrene, polyisoprene, polythiocarbonate, polyallylate, polyhaloallylate, polyallyl ether, polyvinyl acrylate and polyester acrylate. The polycarbonate resin of the present invention can also be used as the binder resin in the charge generating layer described above.

The charge transporting layer can be obtained by forming a layer comprising the polycarbonate resin according to the present invention described above and the charge transporting material on a layer (for example, the charge generating layer) which is a base.

Various methods such as publicly known methods can be used as a method for forming the above charge transporting layer. Usually, used is a method in which a coating liquid prepared by dispersing or dissolving the charge transporting material and the polycarbonate resin according to the present invention in a suitable solvent or together with other binder resin as long as the object of the present invention is not disturbed is coated on a substrate which is a prescribed base and dried. A blending proportion of the charge transporting substance used for forming the charge transporting layer to the polycarbonate resin is preferably 20:80 to 80:20, more preferably 30:70 to 70:30 in terms of a mass ratio.

In the above charge transporting layer, the polycarbonate resin described above can be used alone or in a mixture of two or more kinds thereof. Further, the resins given as the binder resin used for the charge generating layer described above can be used in combination with the polycarbonate resin described above as long as the object of the present invention is not inhibited from being achieved.

The charge transporting layer thus formed has a thickness of usually 5 to 100 μm, preferably 10 to 30 μm. If this thickness is less than 5 μm, the initial electric potential is likely to be reduced. On the other hand, if it exceeds 100 μm, a reduction in the electrophotographic characteristics is likely to be brought about.

Various publicly known compounds can be used as the charge transporting material which can be used together with the polycarbonate resin according to the present invention. Capable of being suitably used as the above compounds are carbazole compounds, indole compounds, imidazole compounds, oxazole compounds, pyrazole compounds, oxadiazole compounds, pyrazoline compounds, thiadiazole compounds, aniline compounds, hydrazone compounds, aromatic amine compounds, aliphatic amine compounds, stilbene compounds, fluorenone compounds, butadiene compounds, quinone compounds, quinodimethane compounds, thiazole compounds, triazole compounds, imidazolone compounds, imidazolidine compounds, bisimidazolidine compounds, oxazolone compounds, benzothiazole compounds, benzimidazole compounds, quinazoline compounds, benzofuran compounds, acridine compounds, phenazine compounds, poly-N-vinylcarbazole, polyvinylpyrene, polyvinylanthracene, polyvinylacridine, poly-9-vinylphenylanthracene, pyrene-formaldehyde resins, ethylcarbazole resins and polymers having the above structures in a principal chain and a side chain. The above compounds may be used alone or in combination of two or more kinds thereof.

Among the above charge transporting materials, compounds specifically shown as the examples in Japanese Patent Application Laid-Open No. 172003/1999 are particularly suitably used.

In the electrophotographic photoreceptor of the present invention, an undercoating layer which is usually used can be provided between the conductive substrate and the photosensitive layer each described above. Capable of being used for the above undercoating layer are fine particles of titanium oxide, aluminum oxide, zirconia, titanic acid, zirconic acid, lanthanic acid, titan black, silica, lead titanate, barium titanate, tin oxide, indium oxide and silicon oxide and components such as polyamide resins, phenol resins, casein, melamine resins, benzoguanamine resins, polyurethane resins, epoxy resins, cellulose, nitrocellulose, polyvinyl alcohol and polyvinylbutyral resins. The binder resins described above or the polycarbonate resin according to the present invention may be used as a resin used for the above undercoating layer. The above fine particles and resins can be used alone or in a mixture of various kinds thereof. When they are used in a mixture thereof, combined use of the inorganic fine particles with the resins allows a coating film having a good smoothness to be formed, and therefore it is suited.

The above undercoating layer has a thickness of usually 0.01 to 10 μm, preferably 0.01 to 1 μm. If this thickness is less than 0.01 μm, it is likely to be difficult to form evenly the undercoating layer.

On the other hand, if it exceeds 10 μm, a reduction in the electrophotographic characteristics is likely to be brought about.

A publicly known blocking layer which is usually used can be provided between the conductive substrate and the photosensitive layer each described above. The same ones as the binder resins described above can be used for the above blocking layer. The above blocking layer has a thickness of usually 0.01 to 20 μm, preferably 0.01 to 10 μm. If this thickness is 0.01 μm or more, it is easy to form evenly the blocking layer. On the other hand, if it is 20 μm or less, a reduction in the electrophotographic characteristics is not likely to be brought about.

Further, in the electrophotographic photoreceptor of the present invention, a protective layer may be laminated on the photosensitive layer. The same resins as the binder resins described above can be used for the above protective layer. Further, the polycarbonate resin according to the present invention can be used as well therefor. The above protective layer has a thickness of usually 0.01 to 20 μm, preferably 0.01 to 10 μm. The above protective layer may contain the charge generating material and the charge transporting material each described above, additives, metals and oxides thereof, nitrides, salts, alloys, carbon blacks and conductive materials such as organic conductive compounds.

Further, in order to enhance the performances of the electrophotographic photoreceptor, a binder, a plasticizer, a curing catalyst, a fluidizing agent, a pinhole-controlling agent and a spectral sensitizer (sensitizing dye) may be added to the charge generating layer and the charge transporting layer each described above. Further, additives such as various chemical substances, an antioxidant, a surfactant, a curling preventive and a leveling agent can be added for the purpose of preventing an increase in the residual potential, a reduction in the charging potential and a reduction in the sensitivity in repeated use.

The binder described above includes silicone resins, polyamide resins, polyurethane resins, polyester resins, epoxy resins, polyketone resins, polycarbonate resins, polystyrene resins, polymethacrylate resins, polyacrylamide resins, polybutadiene resins, polyisoprene resins, melamine resins, benzoguanamine resins, polychloroprene resins, polyacrylonitrile resins, ethyl cellulose resins, nitrocellulose resins, urea resins, phenol resins, phenoxy resins, polyvinylbutyral resins, formal resins, vinyl acetate resins, vinyl acetate/vinyl chloride copolymerized resins and polyester carbonate resins. Further, heat- and/or photo-curing resins can be used as well. In any cases, it shall not specifically be restricted as long as it is a resin which is electrically insulating and which can form a coating film in an ordinary state.

The above binder is preferably added in a blending proportion of 1 to 200 mass %, more preferably 5 to 100 mass % based on the polycarbonate resin according to the present invention. If a blending proportion of the above binder is less than 1 mass %, a coating film of the photosensitive layer is likely to be uneven, and if it exceeds 200 mass %, the sensitivity is likely to be reduced.

The specific examples of the plasticizer described above include biphenyl, biphenyl chloride, o-terphenyl, halogenated paraffin, dimethylnaphthalene, dimethyl phthalate, dibutyl phthalate, dioctyl phthalate, diethylene glycol phthalate, triphenyl phosphate, diisobutyl adipate, dimethyl sebacate, dibutyl sebacate, butyl laurate, methylphthalylethyl glycolate, dimethyl glycol phthalate, methylnaphthalene, benzophenone, polypropylene, polystyrene and fluorohydrocarbon.

The specific examples of the curing catalyst described above include methanesulfonic acid, dodecylbenzenesulfonic acid and dinonylnaphthalenedisulfonic acid, and the fluidizing agent includes Modaflow and Acronal 4F. The pinhole-controlling agent includes benzoin and dimethyl phthalate.

The above plasticizers, curing catalysts, fluidizing agents and pinhole-controlling agents are preferably used in a proportion of 5 mass % or less based on the charge transporting material described above.

When a sensitizing dye is used as the spectral sensitizer, suited are, for example, triphenylmethane base dyes such as methyl violet, crystal violet, Night Blue and Victoria Blue, acridine dyes such as erythrocin, Rhodamine B, Rhodamine 3R, acridine orange and flapeocin, thiazine dyes such as Methylene Blue and Methylene Green, oxazine dyes such as Capri Blue and Meldra Blue, cyanine dyes, merocyanine dyes, styryl dyes, pyrylium salt dyes and thiopyrylium salt dyes.

An electron accepting material can be added to the photosensitive layer for the purposes of a rise in a sensitivity, a reduction in a residual potential and a reduction in fatigue in repeated use.

Preferred as the specific examples thereof are compounds having a large electron affinity such as succinic anhydride, maleic anhydride, dibromomaleic anhydride, phthalic anhydride, tetrachlorophthalic anhydride, tetrabromophthalic anhydride, 3-nitrophthalic anhydride, 4-nitrophthalic anhydride, pyromellitic anhydride, mellitic anhydride, tetracyanoethylene, tetracyanoquinodimethane, o-dinitrobenzene, m-dinitrobenzene, 1,3,5-trinitrobenzene, p-nitrobenzonitorile, picryl chloride, quinonechloroimido, chloranil, bromanil, benzoquinone, 2,3-dichlorobenzoquinone, dichlorodicyanoparabenzoquinone, naphthoquinone, diphenoquinone, tropoquinone, anthraquinone, 1-chloroanthraquinone, dinitroanthraquinone, 4-nitrobenzophenone, 4,4'-dinitrobenzophenone, 4-nitrobenzalmalondinitrile, ethyl α-cyano-β-(p-cyanophenyl)acrylate, 9-anthracenylmethylmalondinitrile, 1-cyano-(p-nitrophenyl)-2-(p-chlorophenyl)ethylene, 2,7-dinitrofluorenone, 2,4,7-trinitrofluorenone, 2,4,5,7-tetranitrofluorenone, 9-fluorenylidene-(dicyanomethylenemalononitrile), polynitro-9-fluorenylidene-(dicyanomethylenemalonodinitrile), picric acid, o-nitrobenzoic acid, p-nitrobenzoic acid, 3,5-dinitrobenzoic acid, pentafluorobenzoic acid, 5-nitrosalicylic acid, 3,5-dinitrosalicylic acid, phthalic acid and mellitic acid. The above compounds may be added to either of the charge generating layer and the charge transporting layer, and a blending proportion thereof is usually 0.01 to 200 mass %, preferably 0.1 to 50 mass % based on the charge generating material or the charge transporting material.

Further, allowed to be used in order to improve the surface property are ethylene tetrafluoride resins, ethylene trifluoride chloride resins, ethylene tetrafluoride propylene hexafluoride resins, vinyl fluoride resins, vinylidene fluoride resins, ethylene difluoride dichloride resins and copolymers thereof and fluorine base graft polymers. A blending proportion of the above surface modifying agents is usually 0.1 to 60 mass %, preferably 2 to 40 mass % based on the binder resin described above. If a blending proportion thereof is less than 0.1 mass %, surface modification such as a surface durability, a reduction in the surface energy and the like is likely to be unsatisfactory. On the other hand, if it exceeds 60 mass %, a reduction in the electrophotographic characteristics is likely to be brought about.

Hindered phenol base antioxidants, aromatic amine base antioxidants, hindered amine base antioxidants, sulfide base antioxidants and organic phosphorus base antioxidants are preferred as the antioxidants described above. A blending proportion of the above antioxidants is usually 0.01 to 10 mass %, preferably 0.1 to 5 mass % based on the charge transporting material described above.

The specific examples of the hindered phenol base antioxidants, the aromatic amine base antioxidants, the hindered amine base antioxidants, the sulfide base antioxidants and the organic phosphorus base antioxidants include those described in Japanese Patent Application Laid-Open No. 172003/1999.

The above antioxidants may be used alone or in a mixture of two or more kinds thereof. They may be added to the surface protective layer, the undercoating layer and the blocking layer in addition to the photosensitive layer described above.

A solvent used for forming the charge generating layer and the charge transporting layer described above includes, for example, aromatic solvents such as benzene, toluene, xylene, chlorobenzene and anisole, ketones such as acetone, methyl ethyl ketone and cyclohexanone, alcohols such as methanol, ethanol and isopropanol, esters such as ethyl acetate and ethyl cellosolve, halogen base hydrocarbons such as carbon tetrachloride, chloroform, dichloromethane and tetrachloroethane, ethers such as tetrahydrofuran and dioxane, dimethylformamide and dimethylsulfoxide. The above solvents may be used alone or in a mixture of two or more kinds thereof.

In a method for forming the charge transporting layer described above, the charge transporting material, the additives and the polycarbonate resin which is used as the binder resin each described above are dispersed or dissolved in the solvent to prepare a coating liquid, and this liquid is coated, for example, on the charge transporting layer described above which is a prescribed base to form the charge transporting layer of a form in which the polycarbonate resin described above is coexistent as the binder resin with the charge transporting material.

In a method for preparing the coating liquid described above, the blend raw materials described above can be dispersed or dissolved by means of a ball mill, a super sonic wave, a paint shaker, a red devil, a sand mill, a mixer or an attritor. In a method for coating the coating liquid thus obtained, capable of being adopted are a dip coating method, an electrostatic coating method, a powder coating method, a spray coating method, a roll coating method, an applicator coating method, a spray coater coating method, a bar coater coating method, a roll coater coating method, a dip coater coating method, a doctor blade coating method, a wire bar coating method, a knife coater coating method, an attritor coating method, a spinner coating method, a bead coating method, a blade coating method and a curtain coating method.

The photosensitive layer of the single layer type electrophotographic photoreceptor is formed by using the polycarbonate resin, the charge generating material and the additives each described above and, if necessary, the charge transporting material and other binder resins. In this case, methods for preparing a coating liquid and coating it and the formulations of the additives are the same as in the case of forming the photosensitive layer of the laminated type electrophotographic photoreceptor. Further, also in the above single layer type electrophotographic photoreceptor, an undercoating layer, a blocking layer and a surface protective layer may be provided as is the case with the laminated type electrophotographic photoreceptor described above. In forming these layers, the polycarbonate resin according to the present invention is preferably used as well.

The photosensitive layer in the single layer type electrophotographic photoreceptor has a thickness of usually 5 to 100 μm, preferably 8 to 50 μm. If this thickness is less than 5 μm, the initial electric potential is likely to be reduced.

On the other hand, if it exceeds 100 μm, a reduction in the electrophotographic characteristics is likely to be brought about.

A proportion of the charge generating material to the polycarbonate resin (binder) which are used for producing the above single layer type electrophotographic photoreceptor is usually 1:99 to 30:70, preferably 3:97 to 15:85 in terms of a mass ratio. When adding the charge transporting material, a proportion of the charge transporting material to the polycarbonate resin is usually 5:95 to 80:20, preferably 10:90 to 60:40 in terms of a mass ratio.

The electrophotographic photoreceptor of the present invention thus obtained is a photoreceptor which has an excellent abrasion resistance and in which excellent printing resistance and electrophotographic characteristics are maintained over a long period of time, and it is suitably used in the various electrophotographic fields such as copying machines (monochrome, multicolor and full color; analog and digital), printers (laser, LED and liquid crystal shutter), facsimiles, platemakers and the like.

In using the electrophotographic photoreceptor of the present invention, used for charging are corona discharge (Corotron, Scorotron), contact charge (charged roll, charged brush) and injection charge. Any of a halogen lamp, a fluorescent lamp, a laser (semiconductor, He—Ne), LED and a photoreceptor internal exposure system may be adopted for exposure. Used for development are a dry development system such as cascade development, two component magnetic brush development, single component insulated toner development and single component conductive toner development and a wet development system using a liquid toner. Used for transferring are an electrostatic transferring method such as corona transferring, roller transferring and belt transferring, a pressure transferring method and an adhesion transferring method. Used for fixing are hot roll fixing, radiant flash fixing, open fixing and pressure fixing. Further, a brush cleaner, a magnetic brush cleaner, a magnetic roller cleaner and a blade cleaner are used.

EXAMPLES

Next, the present invention shall be explained in further details with reference to examples, but the present invention shall by no means be restricted by these examples.

Example 1

A solution prepared by dissolving 74 mass parts of 2,2-bis(4-hydroxyphenyl)propane (bisphenol A; bis A) in 585 mass parts of a sodium hydroxide aqueous solution having a concentration of 6 mass % was mixed with 334 mass parts of methylene chloride, and phosgene gas was blown into the above solution in a proportion of 4.2 mass parts/minute for 15 minutes under cooling while stirring. Then, the above reaction liquid was left standing still to separate an organic layer to obtain a methylene chloride solution of a 2,2-bis(4-hydroxyphenyl)propane polycarbonate oligomer (hereinafter referred to as the bis A oligomer) which had a polymerization degree of 2 to 4 and in which a molecular end was a chloroformate group.

Added to 200 ml of a methylene chloride solution of the bis A oligomer described above were 0.9 g of a bisphenol compound represented by the following formula:

[F13]

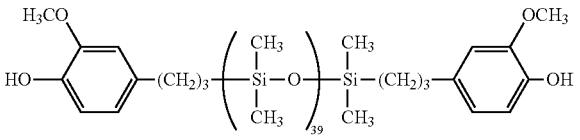

[a compound in which in Formula (4), R is methyl and in which n1 is 3 and n2 is 39; a siloxane monomer (1)] and methylene chloride, and the whole amount was adjusted to 450 ml. Then, 12.5 g of 4,4'-biphenol was mixed with 150 ml of a potassium hydroxide aqueous solution having a concentration of 12.2 mass %, and 0.7 g of p-tert-butylphenol which was a molecular-weight-modifier was added thereto. Next, 2 ml of a triethylamine aqueous solution having a concentration of 7 mass % was added thereto as a catalyst while vigorously stirring the above mixed liquid to carry out reaction at 28° C. for 1.5 hour under stirring. After finishing the reaction, the reaction product was diluted with 1 L of methylene chloride, and then the solution washed in order twice with 1.5 L of water, once with 1 L of 0.01 normal hydrochloric acid and twice with 1 L of water. The organic layer was thrown into methanol, and a polymer deposited was filtered and dried to obtain a copolymerized polycarbonate resin (PC-1).

A solution of the copolymerized polycarbonate resin thus obtained in which methylene chloride was used as a solvent and in which a concentration was 0.5 g/dl had a reduced viscosity [$\eta_{sp}$/C] of 0.85 dl/g at 20° C. The reduced viscosity was measured by means of a Ubbelohde improved type viscometer (RM type) for automatically measuring a viscosity using an automatic viscosity measuring equipment VMR-042 manufactured by Rigo Co., Ltd. The structure and the copolymerization composition of the copolymerized polycarbonate resin (PC-1) obtained were determined by a $^1$H-NMR spectrum.

A mole ratio of the repetitive unit originating in bis A, the repetitive unit originating in the siloxane monomer (1) and the repetitive unit originating in 4,4'-biphenol was 85:0.1:15. A content of the repetitive unit originating in the siloxane monomer (1) was 0.98 mass %.

Further, an electrophotographic photoreceptor was prepared by a method shown below, and the performances thereof were evaluated.

A polyethylene terephthalate resin film on which aluminum metal was deposited was used as a conductive substrate to produce an electrophotographic photoreceptor in which a charge generating layer and a charge transporting layer were laminated in order on the surface of the film to form a laminated photosensitive layer.

Oxotitanium phthalocyanine 0.5 mass part was used as a charge generating material, and a butyral resin 0.5 mass part was used as a binder resin. They were added to 19 mass parts of methylene chloride which was a solvent and dispersed by means of a ball mill, and this dispersion was coated on the surface of the conductive substrate film described above by means of a bar coater and dried, whereby a charge generating layer having a film thickness of about 0.5 μm was formed.

Next, 0.5 g of the following compound (CTM-1) as a charge transporting material:

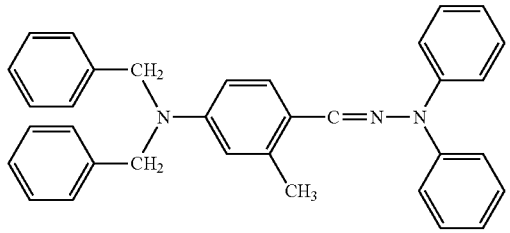

and 0.5 g of the copolymerized polycarbonate resin described above were dissolved in 10 ml of tetrahydrofuran to prepare a coating liquid. This coating liquid was coated on the charge generating layer described above by means of an applicator and dried to form a charge transporting layer having a film thickness of about 20 μm was formed.

Then, the electrophotographic characteristics were measured by means of an electrostatic charge testing apparatus EPA-8100 (manufactured by Kawaguchi Electric Works Co., Ltd.). Corona discharge of −6 kV was carried out to measure the initial surface potential (VO), the residual potential (VR) after 5 seconds since irradiated with light (10 Lux) and the half-life exposure (E1/2). Further, an abrasion resistance of the above charge generating layer was evaluated by means of a Suga abrasion tester NUS-ISO-3 type (manufactured by Suga Test Instruments Co., Ltd.). An abrasion paper (containing alumina particles having a particle diameter of 3 μm) on which a load of 4.9N was applied was brought into contact with the surface of the photosensitive layer, and it was reciprocated thereon 2,000 times to measure an amount of the mass reduced. Further, the same sample as used for evaluating the abrasion resistance was used to measure a dynamic friction coefficient. A surface property tester (manufactured by Heidon Co., Ltd.) was used for measurement to apply a load of 4.9N, and a ball made of stainless steel was used as a friction matter. The results thereof are shown in Table 1.

Example 2

A solution prepared by dissolving 87 mass parts of 1,1-bis(4-hydroxyphenyl)cyclohexane (bisphenol Z; bis Z) in 607 mass parts of a potassium hydroxide aqueous solution having a concentration of 9.4 mass % was mixed with 334 mass parts of methylene chloride, and phosgene gas was blown into the above solution in a proportion of 4.2 mass parts/minute for 15 minutes under cooling while stirring. Then, the above reaction liquid was left standing still to separate an organic layer to obtain a methylene chloride solution of a 1,1-bis(4-hydroxyphenyl)cyclohexane polycarbonate oligomer (hereinafter referred to as the bis Z oligomer) which had a polymerization degree of 2 to 4 and in which a molecular end was a chloroformate group.

Next, a copolymerized polycarbonate resin (PC-2) was obtained by the same method, except that in Example 1, the bis Z oligomer was used in place of the bis A oligomer.

A solution of the copolymerized polycarbonate resin thus obtained in which methylene chloride was used as a solvent and in which a concentration was 0.5 g/dl had a reduced viscosity [$\eta_{sp}$/C] of 0.94 dl/g at 20° C. The structure and the copolymerization composition of the copolymerized polycarbonate resin (PC-2) obtained were determined by a $^1$H-NMR spectrum.

A mole ratio of the repetitive unit originating in bis Z, the repetitive unit originating in the siloxane monomer (1) and the repetitive unit originating in 4,4'-biphenol was 80:0.1:20. A content of the repetitive unit originating in the siloxane monomer (1) was 0.88 mass %.

The copolymerized polycarbonate resin obtained was used to carry out the same evaluation as in Example 1. The results thereof are shown in Table 1.

Example 3

A solution prepared by dissolving 83 mass parts of 2,2-bis(3-methyl-4-hydroxyphenyl)propane (bisphenol C; bis C) in 607 mass parts of a potassium hydroxide aqueous solution having a concentration of 9.4 mass % was mixed with 334 mass parts of methylene chloride, and phosgene gas was blown into the above solution in a proportion of 4.2 mass parts/minute for 15 minutes under cooling while stirring. Then, the above reaction liquid was left standing still to separate an organic layer to obtain a methylene chloride solution of a 2,2-bis(3-methyl-4-hydroxyphenyl)propane polycarbonate oligomer (hereinafter referred to as the bis C oligomer) which had a polymerization degree of 2 to 4 and in which a molecular end was a chloroformate group.

Next, a copolymerized polycarbonate resin (PC-3) was obtained by the same method, except that in Example 1, the bis C oligomer was used in place of the bis A oligomer and that 19.4 g of 1,1-bis(4-hydroxyphenyl)-1-phenylethane was used in place of 12.5 g of 4,4'-biphenol.

A solution of the copolymerized polycarbonate resin thus obtained in which methylene chloride was used as a solvent and in which a concentration was 0.5 g/dl had a reduced viscosity [$\eta_{sp}$/C] of 0.80 dl/g at 20° C. The structure and the copolymerization composition of the copolymerized polycarbonate resin (PC-3) obtained were determined by a $^1$H-NMR spectrum. A mole ratio of the repetitive unit originating in bis C, the repetitive unit originating in the siloxane monomer (1) and the repetitive unit originating in 1,1-bis(4-hydroxyphenyl)-1-phenylethane was 80:0.1:20. A content of the repetitive unit originating in the siloxane monomer (1) was 0.80 mass %.

The copolymerized polycarbonate resin obtained was used to carry out the same evaluation as in Example 1. The results thereof are shown in Table 1.

Example 4

A solution prepared by dissolving 140 mass parts of 1,1-bis(3-cyclohexyl-4-hydroxyphenyl)cyclohexane (bisphenol CHZ; bis CHZ) in 607 mass parts of a potassium hydroxide aqueous solution having a concentration of 9.4 mass % was mixed with 334 mass parts of methylene chloride, and phosgene gas was blown into the above solution in a proportion of 4.2 mass parts/minute for 15 minutes under cooling while stirring. Then, the above reaction liquid was left standing still to separate an organic layer to obtain a methylene chloride solution of a 1,1-bis(3-cyclohexyl-4-hydroxyphenyl)cyclohexane polycarbonate oligomer (hereinafter referred to as the bis CHZ oligomer) which had a polymerization degree of 2 to 4 and in which a molecular end was a chloroformate group.

Next, a copolymerized polycarbonate resin (PC-4) was obtained by the same method, except that in Example 1, the bis CHZ oligomer was used in place of the bis A oligomer and that 28.9 g of bisphenol CHZ was used in place of 12.5 g of 4,4'-biphenol.

A solution of the copolymerized polycarbonate resin thus obtained in which methylene chloride was used as a solvent and in which a concentration was 0.5 g/dl had a reduced viscosity [$\eta_{sp}$/C] of 0.82 dl/g at 20° C. The structure and the copolymerization composition of the copolymerized polycarbonate resin (PC-4) obtained were determined by a $^1$H-NMR spectrum.

A mole ratio of the repetitive unit originating in bis CHZ and the repetitive unit originating in the siloxane monomer (1) was 100:0.1. A content of the repetitive unit originating in the siloxane monomer (1) was 0.60 mass %.

The copolymerized polycarbonate resin obtained was used to carry out the same evaluation as in Example 1. The results thereof are shown in Table 1.

Example 5

A solution prepared by dissolving 104 mass parts of 2,2-bis(4-hydroxyphenyl)adamantane (2,2-adamantanebisphenol; b is 22Ad) in 607 mass parts of a potassium hydroxide aqueous solution having a concentration of 9.4 mass % was mixed with 334 mass parts of methylene chloride, and phosgene gas was blown into the above solution in a proportion of 4.2 mass parts/minute for 15 minutes under cooling while stirring. Then, the above reaction liquid was left standing still to separate an organic layer to obtain a methylene chloride solution of a 2,2-bis(4-hydroxyphenyl)adamantane polycarbonate oligomer (hereinafter referred to as the bis 22Ad oligomer) which had a polymerization degree of 2 to 4 and in which a molecular end was a chloroformate group.

Next, a copolymerized polycarbonate resin (PC-5) was obtained by the same method, except that in Example 1, the bis 22Ad oligomer was used in place of the bis A oligomer and that 25.3 g of 9,9-bis(3-methyl-4-hydroxyphenyl)fluorene was used in place of 12.5 g of 4,4'-biphenol.

A solution of the copolymerized polycarbonate resin thus obtained in which methylene chloride was used as a solvent and in which a concentration was 0.5 g/dl had a reduced viscosity [n7p/C] of 0.97 dl/g at 20° C. The structure and the copolymerization composition of the copolymerized polycarbonate resin (PC-5) obtained were determined by a $^1$H-NMR spectrum.

A mole ratio of the repetitive unit originating in bis 22Ad, the repetitive unit originating in the siloxane monomer (1) and the repetitive unit originating in 9,9-bis(3-methyl-4-hydroxyphenyl)fluorene was 85:0.1:15. A content of the repetitive unit originating in the siloxane monomer (1) was 0.64 mass %.

The copolymerized polycarbonate resin obtained was used to carry out the same evaluation as in Example 1. The results thereof are shown in Table 1.

Example 6

A solution prepared by dissolving 96 mass parts of 1,1-bis(3-methyl-4-hydroxyphenyl)cyclohexane (bisphenol CZ; bis CZ) in 607 mass parts of a potassium hydroxide aqueous solution having a concentration of 9.4 mass % was mixed with 334 mass parts of methylene chloride, and phosgene gas was blown into the above solution in a proportion of 4.2 mass parts/minute for 15 minutes under cooling while stirring. Then, the above reaction liquid was left standing still to separate an organic layer to obtain a methylene chloride solution of a 1,1-bis(3-methyl-4-hydroxyphenyl)cyclohexane polycarbonate oligomer (hereinafter referred to as the bis CZ oligomer) which had a polymerization degree of 2 to 4 and in which a molecular end was a chloroformate group.

Next, a copolymerized polycarbonate resin (PC-6) was obtained by the same method, except that in Example 1, the bis CZ oligomer was used in place of the bis A oligomer.

A solution of the copolymerized polycarbonate resin thus obtained in which methylene chloride was used as a solvent and in which a concentration was 0.5 g/dl had a reduced viscosity [n7p/C] of 0.86 dl/g at 20° C. The structure and the copolymerization composition of the copolymerized polycarbonate resin (PC-6) obtained were determined by a $^1$H-NMR spectrum. A mole ratio of the repetitive unit originating in bis CZ, the repetitive unit originating in the siloxane monomer (1) and the repetitive unit originating in 4,4'-biphenol was 78:0.1:22. A content of the repetitive unit originating in the siloxane monomer (1) was 0.82 mass %.

The copolymerized polycarbonate resin obtained was used to carry out the same evaluation as in Example 1. The results thereof are shown in Table 1.

Example 7

A solution prepared by dissolving 105 mass parts of a mixture (terpene bisphenol; bis TPT) of two kinds of terpene bisphenol represented by the following formula:

[F15]

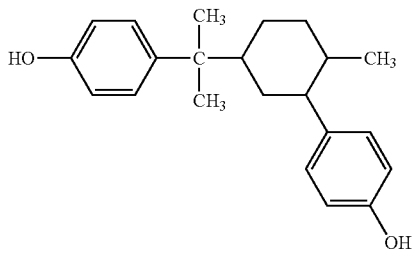

-continued

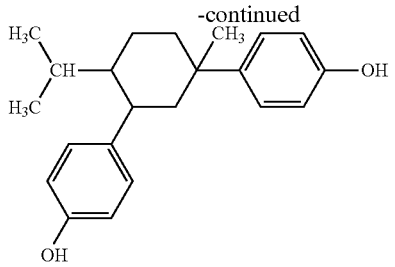

which was synthesized by a method of Synthetic Example 1 described in Japanese Patent Application Laid-Open No. 68817/1997 in 607 mass parts of a potassium hydroxide aqueous solution having a concentration of 9.4 mass % was mixed with 334 mass parts of methylene chloride, and phosgene gas was blown into the above solution in a proportion of 4.2 mass parts/minute for 15 minutes under cooling while stirring. Then, the above reaction liquid was left standing still to separate an organic layer to obtain a methylene chloride solution of a terpene bisphenol polycarbonate oligomer (hereinafter referred to as the bis TPP oligomer) which had a polymerization degree of 2 to 4 and in which a molecular end was a chloroformate group.

Next, a copolymerized polycarbonate resin (PC-7) was obtained by the same method, except that in Example 1, the bis TPP oligomer was used in place of the bis A oligomer and that 21.7 g of the same terpene bisphenol as described above was used in place of 12.5 g of 4,4'-biphenol.

A solution of the copolymerized polycarbonate resin thus obtained in which methylene chloride was used as a solvent and in which a concentration was 0.5 g/dl had a reduced viscosity [$\eta_{sp}$/C] of 0.90 dl/g at 20° C. The structure and the copolymerization composition of the copolymerized polycarbonate resin (PC-7) obtained were determined by a $^1$H-NMR spectrum.

A mole ratio of the repetitive unit originating in bis TPP and the repetitive unit originating in the siloxane monomer (1) was 100:0.1. A content of the repetitive unit originating in the siloxane monomer (1) was 0.80 mass %.

The copolymerized polycarbonate resin obtained was used to carry out the same evaluation as in Example 1. The results thereof are shown in Table 1.

Example 8

A solution prepared by dissolving 101 mass parts of 1,1-bis(4-hydroxyphenyl)-3,3,5-trimethylcyclohexane (trimethylcyclohexylbisphenol; bis I) in 607 mass parts of a potassium hydroxide aqueous solution having a concentration of 9.4 mass % was mixed with 334 mass parts of methylene chloride, and phosgene gas was blown into the above solution in a proportion of 4.2 mass parts/minute for 15 minutes under cooling while stirring. Then, the above reaction liquid was left standing still to separate an organic layer to obtain a methylene chloride solution of a 1,1-bis(4-hydroxyphenyl)-3,3,5-trimethylcyclohexane polycarbonate oligomer (hereinafter referred to as the bis I oligomer) which had a polymerization degree of 2 to 4 and in which a molecular end was a chloroformate group.

Next, a copolymerized polycarbonate resin (PC-8) was obtained by the same method, except that in Example 1, the bis I oligomer was used in place of the bis A oligomer and that 15.3 g of bisphenol A was used in place of 12.5 g of 4,4'-biphenol.

A solution of the copolymerized polycarbonate resin thus obtained in which methylene chloride was used as a solvent and in which a concentration was 0.5 g/dl had a reduced viscosity [$\eta_{sp}$/C] of 0.94 dl/g at 20° C. The structure and the copolymerization composition of the copolymerized polycarbonate resin (PC-8) obtained were determined by a $^1$H-NMR spectrum.

A mole ratio of the repetitive unit originating in bis I, the repetitive unit originating in the siloxane monomer (1) and the repetitive unit originating in bis A was 85:0.1:15. A content of the repetitive unit originating in the siloxane monomer (1) was 0.74 mass %.

The copolymerized polycarbonate resin obtained was used to carry out the same evaluation as in Example 1. The results thereof are shown in Table 1.

Example 9

A solution prepared by dissolving 112 mass parts of 4,4-[1,4-phenylenebis(1-methylethylidene)]bisphenol (Bis PP) in 607 mass parts of a potassium hydroxide aqueous solution having a concentration of 9.4 mass % was mixed with 334 mass parts of methylene chloride, and phosgene gas was blown into the above solution in a proportion of 4.2 mass parts/minute for 15 minutes under cooling while stirring. Then, the above reaction liquid was left standing still to separate an organic layer to obtain a methylene chloride solution of a 4,4-[1,4-phenylenebis(1-methylethylidene)]bisphenol polycarbonate oligomer (hereinafter referred to as the Bis PP oligomer) which had a polymerization degree of 2 to 4 and in which a molecular end was a chloroformate group.

Next, a copolymerized polycarbonate resin (PC-9) was obtained by the same method, except that in Example 1, the Bis PP oligomer was used in place of the bis A oligomer.

A solution of the copolymerized polycarbonate resin thus obtained in which methylene chloride was used as a solvent and in which a concentration was 0.5 g/dl had a reduced viscosity [$\eta_{sp}$/C] of 0.79 dl/g at 20° C. The structure of copolymerized polycarbonate (PC-9) obtained was determined by a $^1$H-NMR spectrum.

A mole ratio of the repetitive unit originating in Bis PP, the repetitive unit originating in the siloxane monomer (1) and the repetitive unit originating in 4,4'-biphenol was 80:0.1:20. A content of the repetitive unit originating in the siloxane monomer (1) was 0.72 mass %.

The copolymerized polycarbonate resin obtained was used to carry out the same evaluation as in Example 1. The results thereof are shown in Table 1.

Example 10

A solution prepared by dissolving 177 mass parts of bis(3,5-dibromo-4-hydroxyphenyl) sulfone (TBS) in 607 mass parts of a potassium hydroxide aqueous solution having a concentration of 9.4 mass % was mixed with 334 mass parts of methylene chloride, and phosgene gas was blown into the above solution in a proportion of 4.2 mass parts/minute for 15 minutes under cooling while stirring. Then, the above reaction liquid was left standing still to separate an organic layer to obtain a methylene chloride solution of a bis(3,5-dibromo-4-hydroxyphenyl) sulfone polycarbonate oligomer (hereinafter referred to as the TBS oligomer) which had a polymerization degree of 2 to 4 and in which a molecular end was a chloroformate group.

Next, a copolymerized polycarbonate resin (PC-10) was obtained by the same method, except that in Example 1, the TBS oligomer was used in place of the bis A oligomer and that 23.6 g of 1,1-bis(4-hydroxyphenyl)diphenylmethane was used in place of 12.5 g of 4,4'-biphenol.

A solution of the copolymerized polycarbonate resin thus obtained in which methylene chloride was used as a solvent and in which a concentration was 0.5 g/dl had a reduced viscosity [$\eta_{sp}$/C] of 0.88 dl/g at 20° C. The structure and the copolymerization composition of the copolymerized polycarbonate resin (PC-10) obtained were determined by a $^1$H-NMR spectrum.

A mole ratio of the repetitive unit originating in TBS, the repetitive unit originating in the siloxane monomer (1) and the repetitive unit originating in 1,1-bis(4-hydroxyphenyl) diphenylmethane was 85:0.1:15. A content of the repetitive unit originating in the siloxane monomer (1) was 0.42 mass %.

The copolymerized polycarbonate resin obtained was used to carry out the same evaluation as in Example 1. The results thereof are shown in Table 1.

Example 11

A solution prepared by dissolving 54 mass parts of 1,1-bis (4-hydroxyphenyl)cyclohexane (bis Z) which was the same as used in Example 2 and 47 mass parts of 9,9-bis(3-methyl-4-hydroxyphenyl)fluorene (FLC) in 607 mass parts of a potassium hydroxide aqueous solution having a concentration of 9.4 mass % was mixed with 334 mass parts of methylene chloride, and phosgene gas was blown into the above solution in a proportion of 4.2 mass parts/minute for 15 minutes under cooling while stirring. Then, the above reaction liquid was left standing still to separate an organic layer to obtain a methylene chloride solution of a 1,1-bis(4-hydroxyphenyl)cyclohexane, 9,9-bis(3-methyl-4-hydroxyphenyl) fluorene polycarbonate oligomer (hereinafter referred to as the Z-FLC oligomer) which had a polymerization degree of 2 to 4 and in which a molecular end was a chloroformate group.

Next, a copolymerized polycarbonate resin (PC-11) was obtained by the same method, except that in Example 1, the Z-FLC oligomer was used in place of the bis A oligomer and that 25.3 g of FLC was used in place of 12.5 g of 4,4'-biphenol.

A solution of the copolymerized polycarbonate resin thus obtained in which methylene chloride was used as a solvent and in which a concentration was 0.5 g/dl had a reduced viscosity [$\eta_{sp}$/C] of 0.81 dl/g at 20° C. The structure of the copolymerized polycarbonate resin (PC-11) obtained was determined by a $^1$H-NMR spectrum.

A mole ratio of the repetitive unit originating in bis Z, the repetitive unit originating in the siloxane monomer (1) and the repetitive unit originating in FLC was 50:0.1:50. A content of the repetitive unit originating in the siloxane monomer (1) was 0.66 mass %.

The copolymerized polycarbonate resin obtained was used to carry out the same evaluation as in Example 1. The results thereof are shown in Table 1.

Example 12

A solution prepared by dissolving 54 mass parts of 1,1-bis (4-hydroxyphenyl)cyclohexane (bis Z) which was the same as used in Example 2 and 25 mass parts of 4,4'-dihydroxydiphenyl ether (DHE) in 607 mass parts of a potassium hydroxide aqueous solution having a concentration of 9.4 mass % was mixed with 334 mass parts of methylene chloride, and phosgene gas was blown into the above solution in a proportion of 4.2 mass parts/minute for 15 minutes under cooling while stirring. Then, the above reaction liquid was left standing still to separate an organic layer to obtain a methylene chloride solution of a 1,1-bis(4-hydroxyphenyl) cyclohexane, 4,4'-dihydroxydiphenyl ether polycarbonate oligomer (hereinafter referred to as the Z-DHE oligomer) which had a polymerization degree of 2 to 4 and in which a molecular end was a chloroformate group.

Next, a copolymerized polycarbonate resin (PC-12) was obtained by the same method, except that in Example 1, the Z-DHE oligomer was used in place of the bis A oligomer.

A solution of the copolymerized polycarbonate resin thus obtained in which methylene chloride was used as a solvent and in which a concentration was 0.5 g/dl had a reduced viscosity [$\eta_{sp}$/C] of 0.93 dl/g at 20° C. The structure of the copolymerized polycarbonate resin (PC-12) obtained was determined by a $^1$H-NMR spectrum.

A mole ratio of the repetitive unit originating in bis Z, the repetitive unit originating in bis DHE, the repetitive unit originating in the siloxane monomer (1) and the repetitive unit originating in 4,4'-biphenol was 50:35:0.1:15. A content of the repetitive unit originating in the siloxane monomer (1) was 0.81 mass %.

The copolymerized polycarbonate resin obtained was used to carry out the same evaluation as in Example 1. The results thereof are shown in Table 1.

Example 13

A solution prepared by dissolving 54 mass parts of 1,1-bis (4-hydroxyphenyl)cyclohexane (bis Z) which was the same as used in Example 2 and 27 mass parts of 4,4'-dihydroxybenzophenone (DHK) in 607 mass parts of a potassium hydroxide aqueous solution having a concentration of 9.4 mass % was mixed with 334 mass parts of methylene chloride, and phosgene gas was blown into the above solution in a proportion of 4.2 mass parts/minute for 15 minutes under cooling while stirring. Then, the above reaction liquid was left standing still to separate an organic layer to obtain a methylene chloride solution of a 1,1-bis(4-hydroxyphenyl) cyclohexane, 4,4'-dihydroxybenzophenone polycarbonate oligomer (hereinafter referred to as the Z-DHK oligomer) which had a polymerization degree of 2 to 4 and in which a molecular end was a chloroformate group.

Next, a copolymerized polycarbonate resin (PC-13) was obtained by the same method, except that in Example 1, the Z-DHK oligomer was used in place of the bis A oligomer and that 14.3 g of Z-DHK was used in place of 12.5 g of 4,4'-biphenol.

A solution of the copolymerized polycarbonate resin thus obtained in which methylene chloride was used as a solvent and in which a concentration was 0.5 g/dl had a reduced viscosity [$\eta_{sp}$/C] of 0.88 dl/g at 20° C. The structure of the copolymerized polycarbonate resin (PC-13) obtained was determined by a $^1$H-NMR spectrum.

A mole ratio of the repetitive unit originating in bis Z, the repetitive unit originating in the siloxane monomer (1) and the repetitive unit originating in DHK was 50:0.1:50. A content of the repetitive unit originating in the siloxane monomer (1) was 0.89 mass %.

The copolymerized polycarbonate resin obtained was used to carry out the same evaluation as in Example 1. The results thereof are shown in Table 1.

Example 14

A solution prepared by dissolving 69 mass parts of 1,1-bis (4-hydroxyphenyl)ethane (bisphenol E; bis E) in 607 mass parts of a potassium hydroxide aqueous solution having a concentration of 9.4 mass % was mixed with 334 mass parts of methylene chloride, and phosgene gas was blown into the above solution in a proportion of 4.2 mass parts/minute for 15 minutes under cooling while stirring. Then, the above reaction liquid was left standing still to separate an organic layer to obtain a methylene chloride solution of a 1,1-bis(4-hydroxyphenyl)ethane polycarbonate oligomer (hereinafter referred to as the bis E oligomer) which had a polymerization degree of 2 to 4 and in which a molecular end was a chloroformate group.

Next, a copolymerized polycarbonate resin (PC-14) was obtained by the same method, except that in Example 1, the bis E oligomer was used in place of the bis A oligomer.

A solution of the copolymerized polycarbonate resin thus obtained in which methylene chloride was used as a solvent and in which a concentration was 0.5 g/dl had a reduced viscosity [$\eta_{sp}$/C] of 0.94 dl/g at 20° C. The structure of the copolymerized polycarbonate resin (PC-14) obtained was determined by a $^1$H-NMR spectrum.

A mole ratio of the repetitive unit originating in bis E, the repetitive unit originating in the siloxane monomer (1) and the repetitive unit originating in 4,4'-biphenol was 85:0.1:15. A content of the repetitive unit originating in the siloxane monomer (1) was 1.07 mass %.

The copolymerized polycarbonate resin obtained was used to carry out the same evaluation as in Example 1. The results thereof are shown in Table 1.

Example 15

A solution prepared by dissolving 79 mass parts of 1,1-bis(4-hydroxyphenyl)butane (bisphenol B; bis B) in 607 mass parts of a potassium hydroxide aqueous solution having a concentration of 9.4 mass % was mixed with 334 mass parts of methylene chloride, and phosgene gas was blown into the above solution in a proportion of 4.2 mass parts/minute for 15 minutes under cooling while stirring. Then, the above reaction liquid was left standing still to separate an organic layer to obtain a methylene chloride solution of a 2,2-bis(4-hydroxyphenyl)butane polycarbonate oligomer (hereinafter referred to as the bis B oligomer) which had a polymerization degree of 2 to 4 and in which a molecular end was a chloroformate group.

Next, a copolymerized polycarbonate resin (PC-15) was obtained by the same method, except that in Example 1, the bis B oligomer was used in place of the bis A oligomer.

A solution of the copolymerized polycarbonate resin thus obtained in which methylene chloride was used as a solvent and in which a concentration was 0.5 g/dl had a reduced viscosity [$\eta_{sp}$/C] of 0.86 dl/g at 20° C. The structure of the copolymerized polycarbonate resin (PC-15) obtained was determined by a $^1$H-NMR spectrum.

A mole ratio of the repetitive unit originating in bis B, the repetitive unit originating in the siloxane monomer (1) and the repetitive unit originating in 4,4'-biphenol was 80:0.1:20. A content of the repetitive unit originating in the siloxane monomer (1) was 0.97 mass %.

The copolymerized polycarbonate resin obtained was used to carry out the same evaluation as in Example 1. The results thereof are shown in Table 1.

Example 16

A copolymerized polycarbonate resin (PC-16) was obtained by the same method, except that in Example 1, the same bis Z oligomer as used in Example 2 was used in place of the bis A oligomer and that 18.0 g of bisphenol Z was used in place of 12.5 g of 4,4'-biphenol.

A solution of the copolymerized polycarbonate resin thus obtained in which methylene chloride was used as a solvent and in which a concentration was 0.5 g/dl had a reduced viscosity [$\eta_{sp}$/C] of 0.88 dl/g at 20° C. The structure and the copolymerization composition of the copolymerized polycarbonate resin (PC-16) obtained were determined by a $^1$H-NMR spectrum.

A mole ratio of the repetitive unit originating in bis Z and the repetitive unit originating in the siloxane monomer (1) was 100:0.1. A content of the repetitive unit originating in the siloxane monomer (1) was 0.96 mass %.

The copolymerized polycarbonate resin obtained was used to carry out the same evaluation as in Example 1. The results thereof are shown in Table 1.

Example 17

A copolymerized polycarbonate resin (PC-17) was obtained by the same method, except that in Example 1, the same bis Z oligomer as used in Example 2 was used in place of the bis A oligomer and that 14.3 g of 3,3'-dimethyl-4,4'-dihydroxybiphenyl was used in place of 12.5 g of 4,4'-biphenol.

A solution of the copolymerized polycarbonate resin thus obtained in which methylene chloride was used as a solvent and in which a concentration was 0.5 g/dl had a reduced viscosity [$\eta_{sp}$/C] of 0.82 dl/g at 20° C. The structure and the copolymerization composition of the copolymerized polycarbonate resin (PC-17) obtained were determined by a $^1$H-NMR spectrum.

A mole ratio of the repetitive unit originating in bis Z, the repetitive unit originating in the siloxane monomer (1) and the repetitive unit originating in 3,3'-dimethyl-4,4'-dihydroxybiphenyl was 85:0.1:15. A content of the repetitive unit originating in the siloxane monomer (1) was 0.84 mass %.

The copolymerized polycarbonate resin obtained was used to carry out the same evaluation as in Example 1. The results thereof are shown in Table 1.

Comparative Example 1

A copolymerized polycarbonate resin (PC-A) was obtained by the same method, except that in Example 1, the siloxane monomer (1) was changed to a siloxane monomer (2) represented by the following formula:

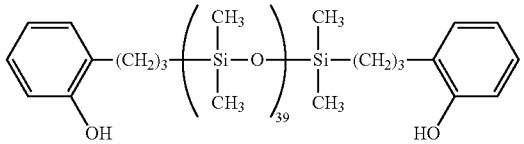

A solution of the copolymerized polycarbonate resin thus obtained in which methylene chloride was used as a solvent and in which a concentration was 0.5 g/dl had a reduced viscosity [$\eta_{sp}$/C] of 0.84 dl/g at 20° C. The structure of the copolymerized polycarbonate resin (PC-A) obtained was determined by a $^1$H-NMR spectrum.

A mole ratio of the repetitive unit originating in bis A, the repetitive unit originating in the siloxane monomer (2) and the repetitive unit originating in 4,4'-biphenol was 85:0.1:15.

The copolymerized polycarbonate resin obtained was used to carry out the same evaluation as in Example 1. The results thereof are shown in Table 1.

Comparative Example 2

A copolymerized polycarbonate resin (PC-B) was obtained by the same method, except that in Example 16, the siloxane monomer (1) was changed to the siloxane monomer (2).

A solution of the copolymerized polycarbonate resin thus obtained in which methylene chloride was used as a solvent and in which a concentration was 0.5 g/dl had a reduced viscosity [$\eta_{sp}$/C] of 0.88 dl/g at 20° C. The structure of the copolymerized polycarbonate resin (PC-B) obtained was determined by a $^1$H-NMR spectrum.

A mole ratio of the repetitive unit originating in bis Z and the repetitive unit originating in the siloxane monomer (2) was 100:0.1.

The copolymerized polycarbonate resin obtained was used to carry out the same evaluation as in Example 1. The results thereof are shown in Table 1.

Comparative Example 3

A polycarbonate resin (PC-C) of bisphenol Z was obtained by the same method, except that in Example 16, the siloxane monomer (1) was not used.

A solution of the polycarbonate resin thus obtained in which methylene chloride was used as a solvent and in which a concentration was 0.5 g/dl had a reduced viscosity [$\eta_{sp}$/C] of 0.89 dl/g at 20° C. The structure of the polycarbonate resin (PC-C) obtained was determined by a $^1$H-NMR spectrum.

The polycarbonate resin obtained was used to carry out the same evaluation as in Example 1. The results thereof are shown in Table 1.

Example 1

| | Initial surface potential (V) | Residual potential (V) | Sensitivity (half-life exposure) (Lux · sec) | Abrasion amount (mg) | Dynamic friction coefficient |
|---|---|---|---|---|---|
| Example 1 | ○ | ○ | ○ | 1.7 | <0.10 |
| Example 2 | ○ | ○ | ○ | 1.4 | <0.10 |
| Example 3 | ○ | ○ | ○ | 1.7 | <0.10 |
| Example 4 | ○ | ○ | ○ | 1.6 | <0.10 |
| Example 5 | ○ | ○ | ○ | 1.5 | <0.10 |
| Example 6 | ○ | ○ | ○ | 1.3 | <0.10 |
| Example 7 | ○ | ○ | ○ | 1.7 | <0.10 |
| Example 8 | ○ | ○ | ○ | 1.8 | <0.10 |
| Example 9 | ○ | ○ | ○ | 1.5 | <0.10 |
| Example 10 | ○ | ○ | ○ | 1.9 | <0.10 |
| Example 11 | ○ | ○ | ○ | 1.9 | <0.10 |
| Example 12 | ○ | ○ | ○ | 1.6 | <0.10 |
| Example 13 | ○ | ○ | ○ | 1.6 | <0.10 |
| Example 14 | ○ | ○ | ○ | 1.6 | <0.10 |
| Example 15 | ○ | ○ | ○ | 1.5 | <0.10 |
| Example 16 | ○ | ○ | ○ | 1.6 | <0.10 |
| Example 17 | ○ | ○ | ○ | 1.6 | <0.10 |
| Comparative Example 1 | ○ | ○ | ○ | 2.4 | <0.10 |
| Comparative Example 2 | ○ | ○ | ○ | 2.2 | <0.10 |
| Comparative Example 3 | ○ | ○ | ○ | 2.0 | 0.70 |

Remarks:

Surface potential: cases in which it falls in a range of −740 to −770 V were marked with ○, and the others were marked with X Residual potential: cases of 0 to −5 V were marked with ○, and the others were marked with X Sensitivity: values of 0.85 Lux.sec or less were marked with ○, and the others were marked with X

INDUSTRIAL APPLICABILITY

The polycarbonate resin of the present invention is suited as a resin for forming a photosensitive layer of an electrophotographic photoreceptor. The electrophotographic photoreceptor of the present invention using the above polycarbonate resin is improved in a cleaning property, a lubricity and an abrasion resistance and is suitably used in the various electrophotographic fields such as copying machines (monochrome, multicolor and full color; analog and digital), printers (laser, LED and liquid crystal shutter), facsimiles, platemakers and the like.

What is claimed is:

1. A polycarbonate resin comprising a repetitive unit represented by the following Formula (1) and a repetitive unit represented by the following Formula (2):

[F1]

(1)

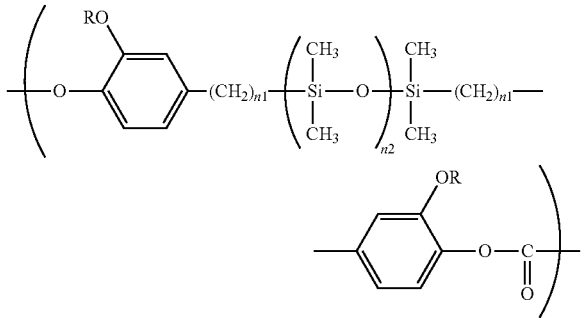

(wherein R represents an alkyl group having 1 to 3 carbon atoms; n1 is an integer of 2 to 4; and n2 is an integer of 1 to 200),

[F2]

(2)

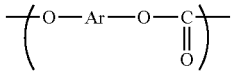

(wherein Ar represents a divalent aromatic group which comprises at least one of groups represented by the following Formula (3):

[F3]

(3)

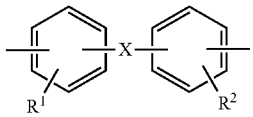

[wherein $R^1$ and $R^2$ each represent independently a group selected from *a hydrogen atom,* a trifluoromethyl group, a halogen atom, an alkyl group having 1 to 10 carbon atoms, an aryl group having 6 to 12 carbon atoms, a cycloalkyl group having 3 to 12 carbon atoms, an alkoxy group having 1 to 6 carbon atoms and an aryloxy group having 6 to 12 carbon atoms; and X represents a group selected from a single bond, —O—, —S—, —SO—, —$SO_2$—, —CO—, —$CR^3R^4$— (wherein $R^3$ and $R^4$ each represent independently a group selected from a hydrogen atom, a trifluoromethyl group, a substituted or unsubstituted alkyl group having 1 to 10 carbon atoms and a substituted or unsubstituted aryl group having 6 to 12 carbon atoms), a substituted or unsubstituted cycloalkylidene group having 5 to 11 carbon atoms, a substituted or unsubstituted α,ω-alkylene group having 2 to 12 carbon atoms, a substituted or unsubstituted 9,9-fluorenylidene group, a substituted or unsubstituted arylene group having 6 to 12 carbon atoms, a divalent group derived from natural terpenes represented by the following formula:

[F4]

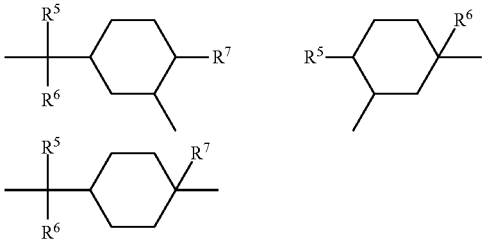

(wherein $R^5$ to $R^7$ represent the same groups as those represented by $R^1$ and $R^2$) and an alkylidenearylenealkylidene group having 8 to 16 carbon atoms represented by the following formula:

[F5]

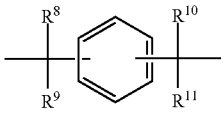

(wherein $R^8$ to $R^{11}$ represent the same groups as those represented by $R^1$ and $R^2$)], and wherein [the group represented by formula (3) is]

(i) *the group represented by formula (3) is* a combination of the group in which X is a single bond and the group in which X is a group other than a single bond, or (ii) *the group represented by formula (3) is* a combination of the group in which all X are a single bond *and n2 in formula (1) is an integer of 39 to 200.*

2. The polycarbonate resin as described in claim 1, wherein the group represented by Formula (3) is a combination of the group in which X is a single bond and the group in which X is a group other than a single bond.

3. The polycarbonate resin as described in claim 1, wherein n2 is an integer of 10 to 100.

4. An electrophotographic photoreceptor in which a photosensitive layer is provided on a conductive substrate, wherein (1) the photosensitive layer is comprised of a laminate comprising at least one charge generating layer and at least one charge transporting layer comprising a charge transporting material and a polycarbonate resin, wherein the polycarbonate resin comprises a repetitive unit represented by the following formula (1):

(1)

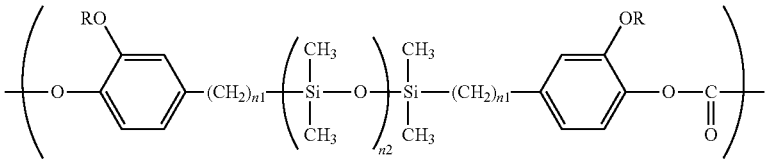

(wherein R represents an alkyl group having 1 to 3 carbon atoms; n1 is an integer of 2 to 4; and n2 is an integer of 1 to 200);

wherein the ratio of charge transporting material to polycarbonate resin is 20:80 to 80:20 by mass; or (2) the photosensitive layer is comprised of a single layer comprising at least one polycarbonate resin represented by said formula (1), at least one charge generating material and at least one charge transporting material;

wherein the ratio of the at least one charge transporting material to the at least one polycarbonate resin is 5:95 to 80:20 by mass.

5. The electrophotographic photoreceptor as described in claim 4, wherein the polycarbonate resin contained in the photosensitive layer further comprises a repetitive unit represented by the following Formula (2):

[F7]

(2)

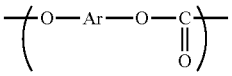

(wherein Ar represents a divalent aromatic group).

6. The electrophotographic photoreceptor as described in claim 5, wherein Ar in Formula (2) comprises at least one of groups represented by the following Formula (3)

[F8]

(3)

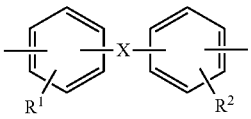

[wherein $R^1$ and $R^2$ each represent independently a group selected from *a hydrogen atom,* a trifluoromethyl group, a halogen atom, an alkyl group having 1 to 10 carbon atoms, an aryl group having 6 to 12 carbon atoms, a cycloalkyl group having 3 to 12 carbon atoms, an alkoxy group having 1 to 6 carbon atoms and an aryloxy group having 6 to 12 carbon atoms; and X represents a group selected from a single bond, —O—, —S—, —SO—, —$SO_2$—, —CO—, —$CR^3R^4$— (wherein $R^3$ and $R^4$ each represent independently a group selected from a hydrogen atom, a trifluoromethyl group, a substituted or unsubstituted alkyl group having 1 to 10 carbon atoms and a substituted or unsubstituted aryl group having 6 to 12 carbon atoms), a substituted or unsubstituted cycloalkylidene group having 5 to 11 carbon atoms, a substituted or unsubstituted α,ω-alkylene group having 2 to 12 carbon atoms, a substituted or unsubstituted 9,9-fluorenylidene group, a substituted or unsubstituted arylene group having 6 to 12 carbon atoms, a divalent group derived from natural terpenes represented by the following formula:

[F9]

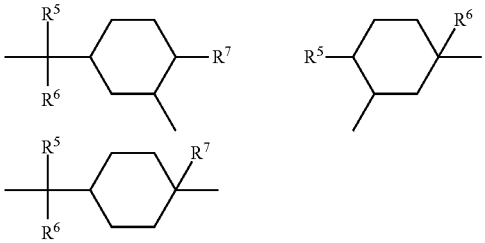

(wherein $R^5$ to $R^7$ represent the same groups as those represented by $R^1$ and $R^2$) and an alkylidenearylenealkylidene group having 8 to 16 carbon atoms represented by the following formula:

[F10]

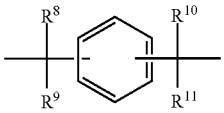

(wherein $R^8$ to $R^{11}$ represent the same groups as those represented by $R^1$ and $R^2$)].

7. The electrophotographic photoreceptor as described in claim 6, wherein X in Formula (3) is a group selected from —$CR^3R^4$—, a single bond, a substituted or unsubstituted cycloalkylidene group having 5 to 11 carbon atoms and a substituted or unsubstituted 9,9-fluorenylidene group.

8. The electrophotographic photoreceptor as described in claim 6, wherein X in Formula (3) is —$CR^3R^4$—, and a proportion of the repetitive unit represented by Formula (1) is 0.01 to 3.9 mass % based on the whole part of the polycarbonate resin.

9. The electrophotographic photoreceptor as described in claim 6, wherein the group represented by Formula (3) is (a) a combination of the group in which X is a single bond and the group in which X is a group other than a single bond, (b) a combination of the group in which X is the substituted or unsubstituted cycloalkylidene group having 5 to 11 carbon atoms and the group in which X is a group other than the substituted or unsubstituted cycloalkylidene group having 5 to 11 carbon atoms, (c) a combination of the group in which X is the substituted or unsubstituted 9,9-fluorenylidene group and the group in which X is a group other than the substituted or unsubstituted 9,9-fluorenylidene group, (d) a combination of the group in which X is the alkylidenearylenealkylidene group having 8 to 16 carbon atoms and the group in which X is a group other than the alkylidenearylenealkylidene group having 8 to 16 carbon atoms, (e) a combination of the group in which X is —SO— and the group in which X is a group other than —SO—, (f) a combination of the group in which X is —O— and the group in which X is a group other than —O— or (g) a combination of the group in which X is —CO— and the group in which X is a group other than —CO—.

10. The electrophotographic photoreceptor as described in claim 4, wherein the polycarbonate resin is used as a binder resin in the charge transporting layer.

11. A polycarbonate resin comprising a repetitive unit represented by the following Formula (1) and a repetitive unit represented by the following Formula (2):

(1)

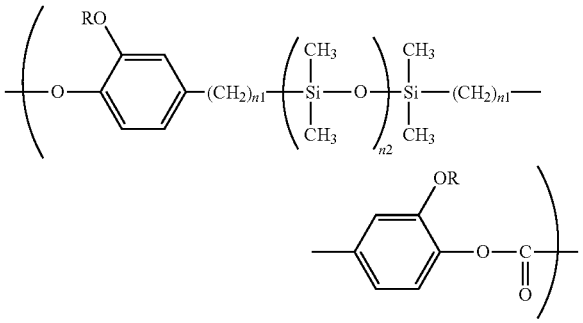

(wherein R represents an alkyl group having 1 to 3 carbon atoms; n1 is an integer of 2 to 4; and n2 is an integer of 1 to 200)

(2)

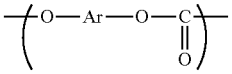

(wherein Ar represents a divalent aromatic group, and comprises at least one of groups represented by the following formula (3))

(3)

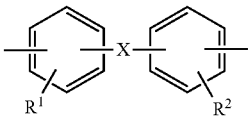

wherein $R^1$ and $R^2$ each represent independently a group selected from *a hydrogen atom,* a trifluoromethyl group, a halogen atom, an alkyl group having 1 to 10 carbon atoms, an aryl group having 6 to 12 carbon atoms, a cycloalkyl group having 3 to 12 carbon atoms, an alkoxy group having 1 to 6 carbon atoms and an aryloxy group having 6 to 12 carbon atoms; X represents a group selected from a single bond, —O—, —S—, —SO—, —$SO_2$—, —CO—, —$CR^3R^4$— (wherein $R^3$ and $R^4$ each represent independently a group selected from a hydrogen atom, a trifluoromethyl group, a substituted or unsubstituted alkyl group having 1 to 10 carbon atoms and a substituted or unsubstituted aryl group having 6 to 12 carbon atoms), a substituted or unsubstituted cycloalkylidene group having 5 to 11 carbon atoms, a substituted or unsubstituted α, ω-alkylene group having 2 to 12 carbon atoms, a substituted or unsubstituted 9,9-fluorenylidene group, a substituted or unsubstituted arylene group having 6 to 12 carbon atoms, a divalent group derived from natural terpenes represented by the following formula:

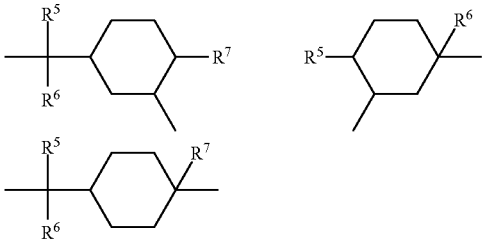

(wherein $R^5$ to $R^7$ represent the same groups as those represented by $R^1$ and $R^2$) and an alkylidenearylenealkylidene group having 8 to 16 carbon atoms represented by the following formula:

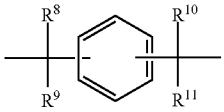

(wherein $R^8$ to $R^{11}$ represent the same groups as those represented by $R^1$ and $R^2$;

and the group represented by Formula (3) is a combination of a group in which X is a substituted or unsubstituted 9,9-fluorenylidene group and a group in which X is a group other than a substituted or unsubstituted 9,9-fluorenylidene group.

*12. The polycarbonate resin as described in claim 1, wherein $R^1$ and $R^2$ each represent independently a group selected from a trifluoromethyl group, a halogen atom, an alkyl group having 1 to 10 carbon atoms, an aryl group having 6 to 12 carbon atoms, a cycloalkyl group having 3 to 12 carbon atoms, an alkoxy group having 1 to 6 carbon atoms and an aryloxy group having 6 to 12 carbon atoms.*

*13. The polycarbonate resin as described in claim 1, wherein at least one of $R^1$ and $R^2$ represents a hydrogen atom.*

*14. The polycarbonate resin as described in claim 1, wherein both $R^1$ and $R^2$ represent a hydrogen atom.*

*15. The electrophotographic photoreceptor as described in claim 6, wherein $R^1$ and $R^2$ each represent independently a group selected from a trifluoromethyl group, a halogen atom, an alkyl group having 1 to 10 carbon atoms, an aryl group having 6 to 12 carbon atoms, a cycloalkyl group having 3 to 12 carbon atoms, an alkoxy group having 1 to 6 carbon atoms and an aryloxy group having 6 to 12 carbon atoms.*

*16. The electrophotographic photoreceptor as described in claim 6, wherein at least one of $R^1$ and $R^2$ represents a hydrogen atom.*

*17. The electrophotographic photoreceptor as described in claim 6, wherein both $R^1$ and $R^2$ represent a hydrogen atom.*

*18. The polycarbonate resin as described in claim 11, wherein $R^1$ and $R^2$ each represent independently a group selected from a trifluoromethyl group, a halogen atom, an alkyl group having 1 to 10 carbon atoms, an aryl group having 6 to 12 carbon atoms, a cycloalkyl group having 3 to 12 carbon atoms, an alkoxy group having 1 to 6 carbon atoms and an aryloxy group having 6 to 12 carbon atoms.*

*19. The polycarbonate resin as described in claim 11, wherein at least one of $R^1$ and $R^2$ represents a hydrogen atom.*

*20. The polycarbonate resin as described in claim 11, wherein both $R^1$ and $R^2$ represent a hydrogen atom.*

*21. The polycarbonate resin as described in claim 1, wherein n2 is an integer of 100 to 200.*

* * * * *